(12) United States Patent
Crook et al.

(10) Patent No.: US 9,957,397 B2
(45) Date of Patent: May 1, 2018

(54) FIRE RESISTANT GLAZING UNIT

(71) Applicant: PYROGUARD UK LIMITED, St Helens, Merseyside (GB)

(72) Inventors: Vincent Crook, St Helens (GB); Muhammad I. Ali, St Helens (GB)

(73) Assignee: PYROGUARD UK LIMITED, Haydock, Merseyside (GB)

( * ) Notice: Subject to any disclaimer, the term of this patent is extended or adjusted under 35 U.S.C. 154(b) by 787 days.

(21) Appl. No.: 14/378,475

(22) PCT Filed: Feb. 21, 2013

(86) PCT No.: PCT/GB2013/050425
§ 371 (c)(1),
(2) Date: Aug. 13, 2014

(87) PCT Pub. No.: WO2013/124661
PCT Pub. Date: Aug. 29, 2013

(65) Prior Publication Data
US 2015/0000825 A1    Jan. 1, 2015

(30) Foreign Application Priority Data

Feb. 22, 2012 (GB) .................................. 1203086.2

(51) Int. Cl.
| | |
|---|---|
| C08K 3/30 | (2006.01) |
| C09D 5/18 | (2006.01) |
| B32B 17/10 | (2006.01) |
| C09K 21/14 | (2006.01) |
| C03C 27/10 | (2006.01) |
| C08K 3/20 | (2006.01) |
| C08K 3/22 | (2006.01) |
| C08K 5/098 | (2006.01) |
| C09D 7/12 | (2006.01) |

(52) U.S. Cl.
CPC .......... *C09D 5/18* (2013.01); *B32B 17/10311* (2013.01); *C03C 27/10* (2013.01); *C08K 3/20* (2013.01); *C08K 3/22* (2013.01); *C08K 3/30* (2013.01); *C08K 5/098* (2013.01); *C09D 7/1216* (2013.01); *C09D 7/1233* (2013.01); *C09K 21/14* (2013.01); *C08K 2003/222* (2013.01); *C08K 2003/3063* (2013.01)

(58) Field of Classification Search
CPC ...... C09D 5/18; C09D 7/1216; C09D 7/1233; C08K 3/22; C08K 3/30; C08K 5/098; C08K 3/20; C08K 2003/3063; C08K 2003/222; C03C 27/10
USPC ....................................................... 524/423
See application file for complete search history.

(56) References Cited

U.S. PATENT DOCUMENTS

| | | | |
|---|---|---|---|
| 2,213,468 A | 9/1940 | Haven | |
| 2,389,360 A | 11/1945 | Guyer et al. | |
| 3,759,771 A | 9/1973 | Battersby | |
| 4,164,108 A | 8/1979 | Ortmanns | |
| 4,264,681 A | 4/1981 | Girard et al. | |
| 4,830,913 A | 5/1989 | Ortmans et al. | |
| 4,983,464 A | 1/1991 | Holzer et al. | |
| 5,061,748 A | 10/1991 | Bolton et al. | |
| 5,124,208 A * | 6/1992 | Bolton | B32B 17/10311 109/49.5 |
| 5,437,902 A * | 8/1995 | Itoh | B32B 17/10036 428/192 |
| 5,622,168 A | 4/1997 | Keusch | |
| 6,479,156 B1 | 11/2002 | Schmidt et al. | |
| 7,223,827 B1 | 5/2007 | Miller | |
| 7,678,291 B2 | 3/2010 | Oota et al. | |
| 7,704,406 B2 | 4/2010 | Wenderoth et al. | |
| 2009/0258171 A1 | 10/2009 | Uang | |
| 2010/0116416 A1 | 5/2010 | Grussaute-Nghiem et al. | |
| 2011/0088513 A1 | 4/2011 | Schimrosczyk et al. | |
| 2011/0135896 A1* | 6/2011 | Oh | B32B 17/10174 428/215 |

FOREIGN PATENT DOCUMENTS

| | | |
|---|---|---|
| DE | 3530968 | 3/1987 |
| EP | 0465442 | 1/1992 |
| EP | 0524786 | 1/1993 |
| EP | 0590978 | 4/1994 |
| EP | 2330174 | 6/2011 |
| WO | WO 00/55245 A1 | 9/2000 |
| WO | WO2003/061963 | 7/2003 |
| WO | WO2008/084083 | 7/2008 |
| WO | WO2009/071409 | 6/2009 |

OTHER PUBLICATIONS

PCT Search Report and Written Opinion for PCT/GB2013/050425, completed May 8, 2013.
United Kingdom Search Report for GB1203086.2, completed Jun. 20, 2012.

* cited by examiner

*Primary Examiner* — Hui Chin
(74) *Attorney, Agent, or Firm* — Barnes & Thornburg LLP

(57) ABSTRACT

The present invention relates to a fire resistant glazing unit (10), and in particular to novel curable gelling compositions which may form a fire-resistant hydrogel interlayer (3) between the glass panes (1) of the glazing unit (10). The gelling compositions of the invention comprise 5-40% w/w of a curable hydrogel-forming component (typically an acidic vinyl monomer such as acrylic acid or its metal salt); 20-60% w/w of one or more salts (e.g. magnesium salts); 40-90% w/w of an aqueous vehicle; and the gelling compositions have an acidic p H between p H 1 and 7. Such gelling compositions, when cured to form a hydrogel interlayer, provide excellent fire-resistant properties and also an excellent radiation barrier in the event of a fire.

26 Claims, 5 Drawing Sheets

FIRE RESISTANT GLAZING UNIT

CROSS-REFERENCE TO RELATED APPLICATIONS

This application is a national stage entry under 35 USC § 371(b) of PCT International Application No. PCT/GB2013/050425, filed Feb. 21, 2013, and claims the benefit of United Kingdom Patent Application No. 1203086.2, filed on Feb. 22, 2012, both of which are expressly incorporated by reference herein.

INTRODUCTION

The present invention relates to a fire resistant glazing unit. The present invention also relates to a process for the manufacture of the glazing units of the invention and to a curable gelling composition which is used in the manufacture of these glazing units.

BACKGROUND ART

Glazing, such as "insulated glazing units" (IGUs) and the like, are widely used in both domestic environments (e.g. double-glazed windows for homes) and in industrial settings.

Typically glazing is not well suited to environments where an inherent fire risk exists.

In general, glazing suffers from poor fire resistance due to the vulnerability of glass to thermal shock and the resultant loss of integrity. This can be a problem when considering the safety of users of the building in the event of a fire. Furthermore, in many countries safety regulations specify the fire resistance that needs to be exhibited by glazing used in a particular location.

Fire resistance is the ability of a barrier to control the passage of the products of fire from one side of the barrier to the other, to a defined level for a defined time under standard conditions of test. Three properties are commonly defined: Integrity (termed E)—The ability to control the passage of flames and hot gases, (thus preventing ignition on the unexposed face), Radiation (termed W)—The ability to control radiated heat emerging from the unexposed face and Insulation (termed I)—The ability to control conducted heat arriving at the unexposed face This has led to classification systems for fire resistant glazing. For example, in much of Europe, regulations classify the fire resistance of glazing by the measurement of the minimum time for which the glazing maintains: (i) its structural integrity (termed E); (ii) its structural integrity and radiation reduction (within specified limits) (termed EW); and (iii) its structural integrity and insulation (within specified limits) (termed EI); when exposed to a fire. Standard tests to determine the classification of the fire resistance of glazing are defined and typically involve exposing the one side of the glazing unit to a fire and monitoring the integrity of the glazing, and/or temperature levels on the opposing side of the glazing, over time.

Fire resistant glazing in which the internal space between the transparent glass panes is filled with an interlayer of aqueous fire-resistant gel are described in U.S. Pat. No. 4,264,681 (SAINT GOBAIN), WO 03/061963 (FLAMRO), and WO 2009/071409 (FLAMRO). Fire resistant glazing comprising silicate based fire-resistant interlayers are also known (see, for example, WO2008/084083 (PILKINGTON)). These are commonly referred to either as glazing units or glazing laminates.

However, there remains a need for new and improved fire resistant glazing. In particular, there is a growing need for fire resistant glazing that meets the most stringent fire resistant criteria. Commonly, in Europe this means that the glazing maintains its integrity provides a barrier from radiation emitted (the radiation measured at 1 m from the sample is to remain below 15 kW/m$^2$) and provides insulation from the fire (the temperature of the cold side of the glazing unit remains less than 140° C. on average and no individual spot exceeds a temperature of 180° C. above ambient) for a minimum of 10 minutes or more but usually for much longer. In addition, there are emerging market requirements for glazing that can maintain its integrity and radiation reduction for over 60 mins.

It is therefore an object of the present invention to provide glazing units that meet these stringent fire resistant criteria. Specifically, the object of the present invention is to provide glazing units which provide excellent insulation whilst also providing an excellent integrity and radiation barrier extending beyond the duration of insulation.

SUMMARY OF THE INVENTION

In accordance with a first aspect of the present invention, there is provided a gelling composition (preferably suitable for forming a fire-resistant hydrogel interlayer within a glazing unit), the gelling composition obtained by mixing together:
  5-40% w/w of a curable hydrogel-forming component;
  20-60% w/w of one or more salts;
  40-90% w/w of an aqueous vehicle;
wherein the composition has an acidic pH greater than or equal to pH 1 and less than pH 7.

In accordance with a second aspect of the present invention, there is provided a gelling composition obtainable by, obtained by, or directly obtained by mixing together:
  5-40% w/w of a curable hydrogel-forming component;
  20-60% w/w of one or more salts;
  40-90% w/w of an aqueous vehicle;
wherein the pH of the composition is between pH 1 and 7.

In accordance with a third aspect of the present invention, there is provided a method of manufacturing a gelling composition (preferably suitable for forming a fire-resistant hydrogel interlayer within a glazing unit), comprising mixing together:
  5-40% w/w of a curable hydrogel-forming component;
  20-60% w/w of one or more salts;
  40-90% w/w of an aqueous vehicle;
to form a gelling composition with an acidic pH greater than or equal to pH 1 and less than pH 7

In accordance with a fourth aspect of the present invention, there is provided a method of manufacturing a gelling composition, comprising mixing together:
  5-40% w/w of a curable hydrogel-forming component;
  20-60% w/w of one or more salts;
  40-90% w/w of an aqueous vehicle;
to form a gelling composition with a pH between pH 1 and 7.

In accordance with a fifth aspect of the present invention, there is provided a gelling composition (preferably suitable for forming a fire-resistant hydrogel interlayer within a glazing unit), the gelling composition comprising:
  5-40% w/w of a curable hydrogel-forming component;
  20-60% w/w of one or more salts;
  40-90% w/w of an aqueous vehicle;
wherein the composition has an acidic pH greater than or equal to pH 1 and less than pH 7.

In accordance with a sixth aspect of the present invention there is provided a gelling composition, comprising:
- 5-40% w/w of a curable hydrogel-forming component;
- 20-60% w/w of one or more salts;
- 40-90% w/w of an aqueous vehicle;

wherein the pH of the composition is between pH 1 and 7.

In accordance with a seventh aspect of the present invention, there is provided a glazing unit comprising a first transparent pane and a second transparent pane with an interlayer disposed therebetween, wherein the interlayer is a hydrogel formed by curing a gelling composition as defined herein.

The glazing unit is suitably sealed about the perimeter edge to retain the gel interlayer in place. The first and second panes may be formed from any suitable transparent material, such as glass or transparent plastic. In certain embodiments, additional panes may be present, for example a third pane and optionally a fourth pane.

In accordance with an eighth aspect of the present invention, there is provided a process for forming a glazing unit as defined herein, the process comprising:
i) providing a first and a second transparent pane;
ii) partially assembling the glazing unit such that the first and second transparent panes are spaced apart from one another and a sealing means holds the first and second panes in position; wherein:
   the sealing means comprises an opening; and
   the first and second panes and the sealing means together define an internal space;
iii) delivering a gelling composition as defined herein into the internal space through the opening in the sealing means;
iv) closing the opening in the sealing means to provide a sealed internal space; and
v) curing the gelling composition to provide a hydrogel gel interlayer within the internal space;

wherein the gel is bonded to the inner surfaces of the first and/or second transparent panes either inherently or by either coating at least one of the internal surfaces of the first and/or second panes with a coupling agent prior to step (iii) or incorporating the coupling agent into the gelling composition.

In accordance with a ninth aspect of the present invention, there is provided a glazing unit, wherein the glazing unit is obtainable by, obtained by, or directly obtained by the process of the eighth aspect.

In accordance with a tenth aspect of the present invention, there is provided a use of the gelling composition described herein to provide fire resistant integrity and a barrier to heat transfer by radiation and/or by conduction.

In accordance with an eleventh aspect of the present invention, there is provided a gelling composition (preferably suitable for forming a fire-resistant hydrogel interlayer within a glazing unit), comprising (or obtained by mixing together):
- 6-16% w/w acrylic acid;
- 20-60% w/w of one or more salts, including:
  - 5-35% w/w (of composition as a whole) $MgSO_4.7H_2O$
  - 0-3% w/w (of composition as a whole) MgO
  - 5-35% w/w (of composition as a whole) $Mg(OAc)_2.4H_2O$;
- 40-90% w/w water;
- 0.02-0.08% w/w cross-linking agent;
- 0.001-0.05% w/w photoinitiator;

wherein the composition has a pH between 4 and 6.

The glazing units of the invention provide a durable radiation barrier in the event of a fire, which duly protects those on the "cold-side" of the glazing units for longer. The excellent performance of the hydrogel interlayer allows for thinner glazing units (i.e. with less space between the respective panes of glass), thus reducing the overall bulk of the glazing units, and making triple-glazing units (and beyond) more viable. In particular, the hydrogel interlayer exhibits good stability. In particular, it remains transparent over normal environmental temperature ranges and does not discolour on prolonged exposure to sunlight.

Upon exposure to a fire, the intumescent properties of the hydrogel interlay cause it to expand towards the heat source especially if the transparent pane on the fire side of the glazing unit becomes compromised. The intumescent property is generally as a result of bubble formation during the resultant controlled release of water from the hydrogel. This intumescent behaviour provides passive protection to the "cold side" of the glazing unit and helps suppress an increase in temperature on the "cold side". In particular, the hydrogel interlayer can expand and deform as it absorbs heat energy from the fire. The ability to do this without forming holes enhances the protection conferred to the cold side of the glazing unit. Moreover, a high melting point inorganic crust tends to form on the surface of the swelled hydrogel layer which further shields the "cold-side" from the fire and maintains the integrity of the glazing unit for longer.

The gelling compositions of the present invention used to form the hydrogel interlayers are safe to handle, easy to manufacture, and environmentally friendly. Such gelling compositions are also compatible with a wide variety of transparent materials.

Without wishing to be bound by theory, it is thought that the advantages of the invention stem from the balance of particular ingredients, their respective amounts, and the pH of the gelling compositions utilised. The particular high loading of salts alongside an acidic pH is thought to be especially important for forming the fire resistant hydrogel interlayers.

Features including optional, suitable, and preferred features of any aspect of the present invention are, unless otherwise stated, also optional, suitable, and preferred features in relation to any other aspect of the present invention.

BRIEF DESCRIPTION OF THE DRAWINGS

To provide a better understanding of the invention, the invention is further described by way of example in reference to the following figures, in which.

DETAILED DESCRIPTION OF THE INVENTION

Definitions

Figure 1:
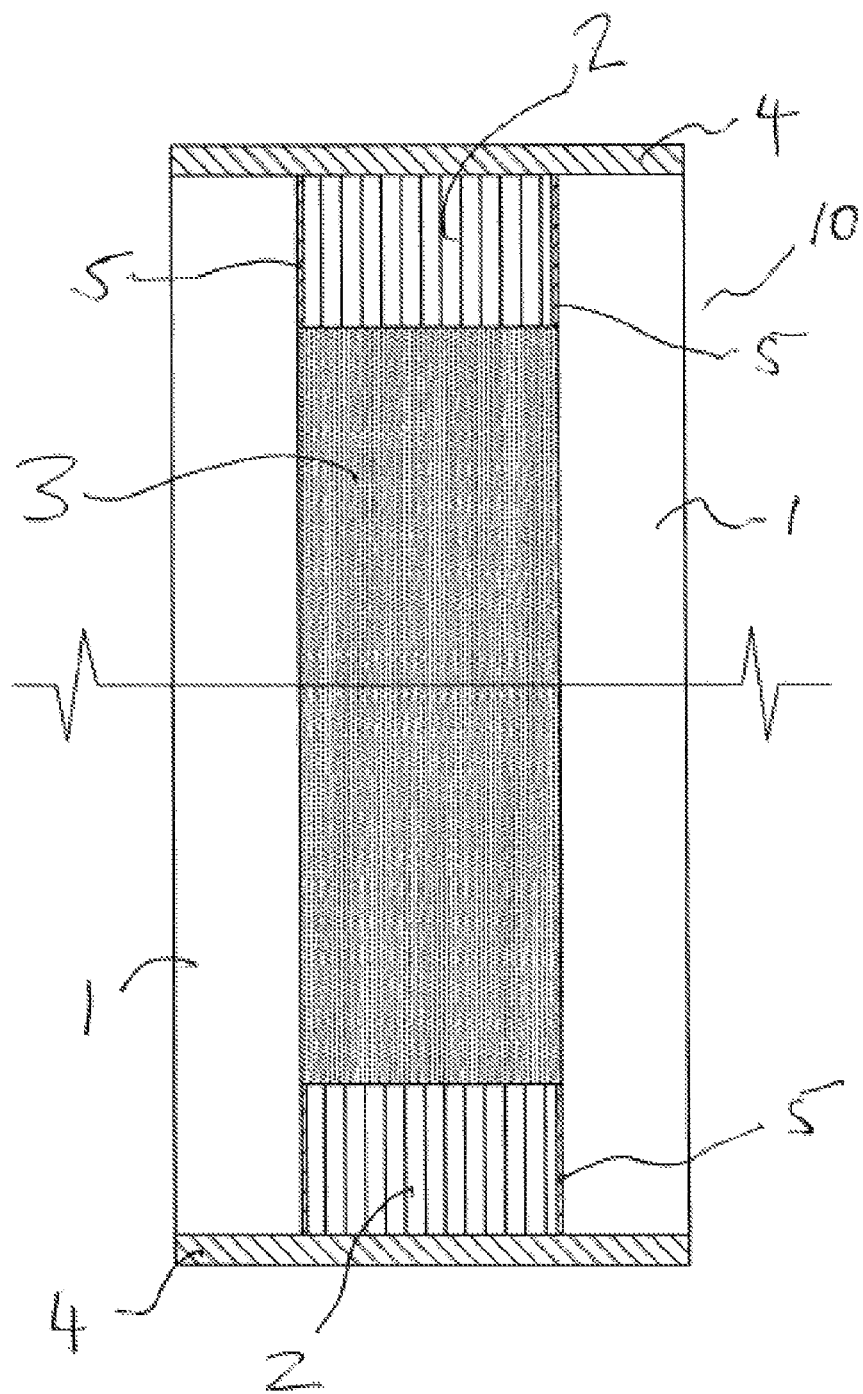
FIG. 1 is a cross-sectional view of a glazed unit.

Herein, a gelling composition suitable "for forming a fire-resistant hydrogel interlayer within a glazing unit" is a composition which cures to form a fire-resistant (transparent) hydrogel that may suitably sit between two panes of glazing in a glazing unit to thereby impart (additional) fire-resistance to the glazing unit as a whole.

The term "transparent pane" is used herein to refer to any transparent material suitable for use in the formation of a glazing unit. Examples of suitable transparent panes include panes of glass or transparent plastic (e.g. polycarbonate).

The term "curable" is used herein to refer to a gelling composition which, upon exposure to sufficient heat or radiation (e.g. UV radiation), permanently changes its physical state. Typically, the physical state changes as polymerisation and polymer cross-linking reactions occur. Curing typically leads to a hardening of the gelling composition.

The term "hydrogel" is used herein to refer to a hydrated gel comprising a hydrophilic polymer network.

The term "cured gelling composition" is used herein to refer to the hydrogel formed following the curing of the gelling composition defined herein.

Unless otherwise stated, pH is measured at standard temperature and pressure as defined by the National Institute of Standards and Technology (NIST), i.e. 20° C. and 101.325 kPa (1 atm).

An "acidic pH" is, as would be understood by those skilled in the art, a pH less than pH 7.

The term "aqueous vehicle" refers to a predominantly water based medium.

The term "(m-nC)alkyl" refers to an alkyl group having m to n carbon atoms.

The term "consists essentially of" used herein in relation to the constitution of a given material, indicates that the given material consists almost entirely of a given constituent, suitably at least 90% w/w, more suitably at least 95% w/w, most suitably at least 99% w/w. For example, the phrase "the 'material' consists essentially of 'constituent X'" indicates that the 'material' comprises at least 90% w/w 'constituent X', more suitably at least 95% w/w, most suitably at least 99% w.w.

The Gelling Composition

The present invention provides a gelling composition as defined herein. Most suitably, the gelling composition is a fire-resistant gelling composition or a gelling composition which is curable to form a fire-resistant gel. The term "fire-resistant" is well understood in the art.

Herein, where the gelling composition (or cured hydrogel formed therefrom) is said to "comprise", "consist of", or be otherwise constituted from a particular ingredient (optionally in a given quantity), this suitably means that this particular ingredient (optionally in the given quantity) is used in the formation of the gelling composition.

The gelling composition is suitably an optically transparent gelling composition. The gelling composition is suitably curable to provide an optically transparent hydrogel.

The gelling composition is suitably in the form a liquid having a viscosity sufficiently low so as to enable it to be poured or injected into the internal space of a glazing unit (as defined further herein). The gelling composition suitably has a viscosity which is sufficiently low so that any bubbles (e.g. formed on pouring) float to the top and can be readily removed (e.g. by venting prior to the gelling composition being sealed in place). Furthermore, the gelling composition is a curable gelling composition, which can be cured, for example, by the application of heat or radiation (e.g. UV), to form a polyelectrolyte hydrogel. Suitably the gelling composition is curable by ultraviolet (UV) radiation curing.

The gelling composition of the invention is suitable for use in the preparation of a glazing unit as defined herein. In particular, the gelling composition is suitable for forming a cured hydrogel interlayer of a glazing unit as defined herein, which imparts heat insulation and significant fire resistant properties to the glazing unit.

The Hydrogel-Forming Component

The hydrogel-forming component of the gelling composition forms the hydrophilic hydrogel polymer matrix following curing.

The hydrogel-forming component is suitably an organic hydrogel-forming component.

The curability of the hydrogel-forming component facilitates the manufacture of the glazing units of the invention because the gelling composition is initially mobile and sufficiently fluid prior to curing so that it can be delivered into the internal space of the glazing units defined herein and then cured in situ to form the hydrogel interlayer.

The hydrogel forming component of the gelling composition forms the polyelectrolyte network of the hydrogel following curing. Such polyelectrolytes suitably dissociate (e.g. from their corresponding counterions) in aqueous solution to yield charged polymers. Such polyelectrolytes are suitably "weak" polyelectrolytes (i.e. with a $pK_a$ between 2 and 10, more suitably between 2 and 7). Suitably, such polyelectrolytes are polyacids which dissociate in aqueous solution to yield polyanions (e.g. carboxylate).

The hydrogel-forming component suitably comprises one or more hydrophilic polymerisable monomers and/or one or more hydrophilic pre-formed or partially formed polymers. In a particular embodiment, the hydrogel-forming component comprises polymerisable monomers, but is (substantially) free of any pre-formed polymers.

In an embodiment, the polymerisable monomer is a vinyl containing monomer that suitably polymerises (e.g. on curing) to form a polyelectrolyte having pendant ionisable groups, especially pendant acidic groups.

In an embodiment, the pre-formed polymer is polyvinyl based polymer, especially a polyvinyl-based polymer having pendant ionisable substituent groups, especially pendant acidic groups.

In a particular embodiment, the hydrogel-forming component comprises a polymerisable hydrophilic monomer. The polymerisable hydrophilic monomer is suitably an acidic monomer, suitably bearing a carboxylic acid moiety (or a moiety which is readily converted to a carboxylic acid moiety, e.g. via hydrolysis, such as an ester (e.g. (1-4C)alkyl ester), acid amide, nitrile, or anhydride thereof). The polymerisable monomer suitably facilitates the formation of acidic hydrogels upon curing.

In an embodiment, the polymerisable monomer is selected from the group consisting of acids such as acrylic acid, methacrylic acid, itaconic acid, vinylsulfonic acid, allylsulfonic acid, methallylsulfonic acid, styrenesulfonic acid, 2-acrylamide-2-phenylpropanesulfonic acid, 2-acrylamide-2-methyl-propanesulfonic acid, vinyl phosphoric acid, (meth)acrylate of ethylene oxide-modified phosphoric acid and the like, and salts thereof; and amines such as N,N-dimethylaminoethyl methacrylate, N,N-diethylaminoethyl methacrylate, N,N-dimethylaminoethyl acrylate, N,N-dimethylaminopropylmethacrylamide, N,N-dimethylaminopropylacrylamide and the like. It is possible to use an acrylate, an polymerisable anhydride, a methacrylate, acrylamide, methacrylamide, acrylonitrile, vinyl phosphoric acid esters or the like as a copolymerizable monomer, since the resulting copolymer can be hydrolysed to impart iconicity. In addition, it may be advantageous to incorporate a non ionisable, non hydrolysable, comonomer in order to impart other properties into the matrix.

In a particular embodiment, the polymerisable monomer is an acrylate or alkylacrylate monomer of Formula (I):

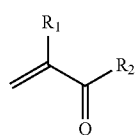

(I)

wherein $R_1$ is H, or (1-2C)alkyl;
$R_2$ is selected from OH, $OR_3$, $NH_2$, $NHR_3$, and $NR_3R_4$; and
$R_3$ and $R_4$ are independently (1-2C)alkyl;
or a salt thereof (e.g. metal carboxylate where $R_2$ is OH, where the metal counterion may be Na, Ca, Mg, etc.).

In an embodiment, $R_1$ is H or methyl.
In another embodiment, $R_1$ is H.
In an embodiment, $R_2$ is OH or $NH_2$.
In an embodiment, $R_2$ is OH.

Suitably the polymerisable monomer is acrylic acid or an alkylacrylic acid, which polymerise to form polyacrylic acid or a polyalkylacrylic acid polymers respectively.

In a particular embodiment, the hydrogel-forming component comprises acrylic acid. In a particular embodiment, the hydrogel-forming component is acrylic acid.

The hydrogel-forming component may comprise monomers and/or pre-formed polymers which afford either homopolymeric hydrogels or co-polymeric (including terpolymers and beyond) hydrogels.

In some embodiments, the hydrogel-forming component comprises monomers and/or pre-formed polymers which afford homopolymeric hydrogels. The hydrogel-forming component may comprise only a single polymerisable monomer which forms hydrogel homopolymers upon curing.

Alternatively, in some embodiments, the hydrogel-forming component comprises monomers and/or pre-formed polymers which afford co-polymeric hydrogels. The hydrogel-forming component may comprise more than one polymerisable monomer, as defined herein, which form hydrogel co-polymers upon curing. It is envisaged that incorporating co-monomers into the hydrogel may allow their properties to be fine tuned.

In a particular embodiment, the hydrogel-forming component comprises a pre-formed polymer. The pre-formed polymer may be a homopolymer or co-polymer. The pre-formed polymer is suitably acidic, most suitably bearing OH or carboxylic acid groups. The pre-formed polymer is suitably a polyacid or polyalcohol, most suitably a polyacrylic acid or polyalkylacrylic acid (e.g. polymethacrylic acid, polyethylacrylic acid).

References herein to acids and polyacids in relation to the hydrogel-forming component are also intended to include their corresponding salts (i.e. conjugate bases), especially metal salts, such as alkali metal salts or alkaline earth metal salts.

Suitably the gelling composition comprises 5-40% w/w hydrogel-forming component. In a particular embodiment, the gelling composition comprises 5-30% w/w hydrogel-forming component. In a particular embodiment, the gelling composition comprises 6-15% w/w hydrogel-forming component. In a particular embodiment, the gelling composition comprises 9-13% w/w hydrogel-forming component. In a particular embodiment, the gelling composition comprises 10-12% w/w hydrogel-forming component. In a particular embodiment, the hydrogel-forming component constitutes 5-10% w/w of the gelling composition.

Suitably the gelling composition comprises 5-40% w/w acrylic acid. In a particular embodiment, the gelling composition comprises 5-30% w/w acrylic acid. In a particular embodiment, the gelling composition comprises 6-15% w/w acrylic acid. In a particular embodiment, the gelling composition comprises 9-13% w/w acrylic acid. In a particular embodiment, the gelling composition comprises 10-12% w/w acrylic acid. In a particular embodiment, acrylic acid constitutes 5-10% w/w of the gelling composition.

The Salt(s)

The gelling composition (and cured gelling compositions formed therefrom) comprises one or more salts. The one or more salts may suitably be one or more organic and/or inorganic salts. Organic salts comprise at least an organic anion (e.g. acetate). Inorganic salts comprise both an inorganic cation (e.g. a metal cation) and an inorganic anion (e.g. oxide, sulphate, halide, etc.).

In preferred embodiments, the one or more salts are or include one or more metal salts. Each metal salt suitably comprises a metal cation. Each metal salt suitably comprises an organic (e.g. acetate) or inorganic (e.g. oxide, sulphate, etc.) anion.

The one or more metal salt(s) may comprise monovalent or divalent cations, or a combination thereof. Suitable monovalent cations include alkali metal monovalent cations (e.g. $Na^+$, $K^+$, $Li^+$) or ammonium ions ($NH_4^+$) or substituted ammonium ions such as alkyl ammonium species. Suitable divalent cations include alkaline earth metal divalent cations (e.g. $Mg^{2+}$, $Ca^{2+}$) or transition metal divalent cations (e.g. $Zn^{2+}$). In a particular embodiment, the metal salt(s) comprises divalent cations, suitably selected from $Mg^{2+}$, $Ca^{2+}$, $Zn^{2+}$, or a combination thereof. In a particular embodiment, the metal salt(s) comprises $Mg^{2+}$ cations. In a particular embodiment, the cations of the one or more salts consist essentially of divalent cations, suitably essentially of $Mg^{2+}$ cations. In a particular embodiment, the cations of the one or more salts consist of divalent cations, suitably of $Mg^{2+}$ cations.

The salt(s) may comprise any suitable anion as a counter ion to any of the above described cations. Particularly suitable anions include halide, sulphate, acetate, borate, silicate, oxide, hydroxide, or a combination thereof. In a particular embodiment, the anion is selected from sulphate, oxide, and hydroxide, or a combination thereof. In a particular embodiment, the salt(s) comprises sulphate anions.

In a particular embodiment, the salt(s) comprises an $Mg^{2+}$ cation and one or more anions selected from sulphate, acetate and oxide. In a particular embodiment, the salt(s) comprises magnesium sulphate, suitably in hydrated form (most suitably $MgSO_4 \cdot 7H_2O$). In a particular embodiment, $MgSO_4 \cdot 7H_2O$ comprises 5-35% w/w of the gelling composition, more suitably 15-25% w/w. In a particular embodiment, the salt(s) comprises magnesium acetate, suitably in hydrated form (most suitably $Mg(OAc)_2 \cdot 4H_2O$). In a particular embodiment, $Mg(OAc)_2 \cdot 4H_2O$ comprises 5-35% w/w of the gelling composition, more suitably 15-25% w/w. In a particular embodiment, the salt(s) comprise magnesium oxide. In a particular embodiment, MgO comprises 0-5% w/w of the gelling composition, suitably 0.5-3.0% w/w, more suitably 1-2.5% w/w. In a particular embodiment, the gelling composition comprises metal salts including magnesium sulphate, magnesium oxide, and magnesium acetate. Suitably any magnesium oxide used is the "low iron" grade thereof. In a particular embodiment, the salt(s) are derived in situ by acid-base reaction using magnesium oxide.

In preferred embodiments, the salts include a mixture of metal salts. Suitably the mixture of metal salts comprises a mixture of anions. In a particular embodiment, the mixture of metal salts comprises a single metal cation and a mixture of anions. For example, the single metal cation may be magnesium (II). The mixture of anions may suitably comprise oxide, sulphate, and acetate.

It will be appreciated by those skilled in the art that references to the one or more salts, whether in general or in relation to particular specific embodiments, relate to the general or particular salt form(s) (i.e. in terms of cationic-anionic associations) of the salt starting material(s). The person skilled in the art would understand that any or all of the one or more salts may in fact adopt different salt forms within the gelling composition (or cured hydrogel) itself. For instance, when forming the gelling composition, a basic salt (e.g. MgO) may react with an acid (e.g. an acidic hydrogel-forming component—e.g. acrylic acid monomer) to form a salt of the acid in situ. In fact MgO is unlikely to exist as such in the gelling composition where the pH is acidic, since all MgO will have generally been neutralised.

Therefore, references to a gelling composition (or indeed the cured hydrogel adduct thereof) "comprising one or more salts", suitably indicates that the gelling composition comprises one or more salts and/or adducts thereof "formed by" (or derived from) mixing said one or more salts together with any other ingredients of the gelling composition.

Where specific salt(s) are stipulated herein, this preferably indicates that the gelling composition may be formed by either the specific salts stipulated or by alternative starting materials which may nevertheless give rise to the same gelling composition. For instance, in a particular embodiment, the gelling composition is obtained by employing the following salts:

5-35% w/w $MgSO_4 \cdot 7H_2O$
0-3% w/w MgO
5-35% w/w $Mg(OAc)_2 \cdot 4H_2O$ but it will be appreciated that replacing MgO with an equimolar amount of $Mg(OH)_2$ will yield the same salt adducts (e.g. through reaction with an acidic hydrogel-forming component) and that this variation is therefore covered by this same embodiment. Furthermore, the $Mg(OAc)_2$ may itself be formed in situ through the reaction of MgO with acetic acid and, as such, this embodiment includes gelling compositions formed in this manner without any pre-isolated $Mg(OAc)_2$ starting material. The person skilled in the art can readily determine, by methods well known in the art, the constitution of a gelling composition with respect to the one or more salts, and could readily determine the nature and quantity of any input salts required to produce said gelling composition. In particular, salts may be extracted (e.g. by Soxhlet extraction), isolated, characterised, and quantified.

In an embodiment, the gelling composition comprises one or more salts in hydrated form.

In an embodiment, the one or more salts suitably constitute 20-60% w/w of the gelling composition.

Suitably, the one or more salts suitably constitute 30-55% w/w of the gelling composition, suitably, 35-52% w/w, and suitably 40-50% w/w of the gelling composition.

The relatively high loading of the salt(s) in the gelling compositions of the invention duly influences the structure and properties of the hydrogel formed by curing the gelling composition.

Significantly, the salt(s) also contribute to the intumescent properties of the hydrogel, which in turn contributes to the passive fire resistant and heat insulation properties of the gel during a fire. The salt(s) can also contribute towards the maintenance of the pH of the gelling composition within the limits defined herein. For instance, metal salts such as MgO suitably raise the pH of the resulting gelling composition, though it will be understood by those skilled in the art that other suitable basifying salts (especially alkaline or basic salts) can be used to adjust the pH to achieve a desirable gelling composition. For instance, other suitable basifying salt(s), which may be used instead of or in addition to MgO, include alkali metal oxides/hydroxides (e.g. lithium or sodium oxide or hydroxide), or even ammonium hydroxide. The gelling composition may suitably comprise 0-5% w/w other basifying salt(s), suitably 0.1-3% w/w, suitably 0.5-2.5% w/w.

Furthermore, any polyvalent metal salts may also provide ionic species capable of forming electrostatic cross-links between the polymers in the hydrogel.

The salt(s) generally also form a high melting point crust on the surface of the hydrogel exposed to a fire. This crust is believed to contribute to the fire-resistant properties of the cured gelling compositions of the present invention.

The salt(s) suitably also contribute to an "anti-freeze" effect in either or both the gelling composition and cured hydrogel formed from the gelling composition. In a particular embodiment, the gelling composition comprises at least one salt which contributes to such an "anti-freeze" effect (i.e. an antifreeze component). Such an antifreeze component may be present within the gelling composition (and ultimate hydrogels formed therefrom) at the exclusion of any other more conventional antifreeze component. In a particular embodiment, the gelling composition (and hydrogels formed therefrom) are free from any (non-salt) organic or solvent-based antifreeze agents. Suitably, the antifreeze component also has fire-resistant properties. Suitably at least one salt contributing said anti-freeze effect is magnesium acetate or a hydrated form thereof. This salt suitably also contributes a buffering effect to the gelling compositions and/or to the ultimate hydrogel formed therefrom.

One skilled in the art would be able to achieve anti-freeze equally well by other means. Commonly by use of NaCl or KCl as described in US2010/0116416 A1. Alternatively the salts, or the lower alcohols described in US2010/7678291 may be incorporated in the gelling compositions. Among other examples described in US2010/7704406 B2, dicarboxylic acid salts would also be suitable additives to the systems described herein. Larger polyhydroxy organic compounds are also useful to achieve an anti freeze effect such as ethylene glycol, propylene glycol, sorbitol and dextrose many of which are described in US2009/0258171.

Aqueous Vehicle

The aqueous vehicle acts as a carrier for the other ingredients of the gelling composition and enables the gelling composition to flow and thereby be poured or otherwise injected into the internal space of a glazing unit prior to curing.

Suitably the gelling composition comprises 40-90% w/w of the aqueous vehicle, more suitably 45-60% w/w, and most suitably 50-55% w/w.

The aqueous vehicle suitably comprises 75-100% w/w water. Any suitable form of water such as ion-exchanged water, distilled water, underground water, tap water and industrial water can be used.

In a preferred embodiment, the aqueous vehicle is 100% w/w water.

In certain embodiments, the aqueous vehicle may comprise a further solvent which is miscible with water. The miscible solvent may be selected from a lower alcohol (suitably a (1-4C)alcohol, such as methanol, ethanol, n-propanol, or i-propanol), a glycol, a ketone, an amide, a saccharide and a urea, and is useful for the prevention of freezing of the aqueous vehicle. For example, the aqueous vehicle may comprise up to 25% w/w of the miscible solvent.

The pH of the Composition

The gelling composition suitably has a pH of between 1 and 7, suitably an acidic pH between 1 and 7 (i.e. greater than or equal to pH 1 but less than pH 7). Maintaining this pH is important for forming cured hydrogels with the required physical and fire resistant properties in particular providing a suitable vehicle for particular (fire retardant) salt additives and maintaining clarity.

Suitably, the pH of the gelling composition is between 3 and 7, suitably between 3.5 and 6, more suitably between 4 and 5.5, most suitably between 4.5 and 5.5. The pH is suitably less than or equal to 6.95, suitably less than or equal to 6.9, suitably less than or equal to 6.8, suitably less than or equal to 6.5. The pH of the gelling composition may be measured using methods well known in the art, suitably by simply submerging a calibrated pH probe directly into the gelling composition.

The pH of the gelling composition may be suitably controlled by adjusting the balance of the acidic and basic ingredients present in the gelling composition. For instance, a buffer system may be generated by mixing appropriate acidic and basic components. Any suitable buffer may be used in conjunction with the gelling compositions of the present invention, although a combination of acetic acid and/or acrylic acid and salts formed from their acid-base reaction with magnesium oxide has been shown to be particularly viable.

In certain embodiments, the hydrogel-forming component may provide some or all of the acidic components (e.g. acidic monomers and/or polymers) that contribute to the buffering of the gelling composition.

In general, if the pH is too low or too high, the gelling composition and/or hydrogel formed therefrom lacks sufficient transparency to be useful in glazing units. Moreover, pH can have a significant effect on the fire-resistance of the resulting cured gels, and may also affect the durability of such gels.

Cross-Linking Agents

In some embodiments, the gelling composition further comprises a cross-linking agent. The cross-linking agent suitably facilitates the cross-linking between polymer chains (and/or internal cross-linking within polymers) during curing of the gelling composition, whether the polymers are pre-formed or formed during curing from polymerisable monomers comprised of the hydrogel-forming component. The cross-linking agent suitably participates in the covalent linking of distinct polymer chains and/or distinct portions of an individual polymer chains.

In some embodiments the cross linking agent partakes in covalent bonding cross-linking through incorporation into more than one polymer chain.

The aforementioned cross-linking agent suitably constitutes 0.001 to 0.1% w/w of the gelling composition, more suitably 0.005 to 0.05% w/w of the gelling composition. In an embodiment, the gelling composition comprises 0.02 to 0.08% w/w cross-linking agent, suitably 0.03-0.06% w/w, more suitably 0.035-0.055% w/w. In an embodiment, the gelling composition comprises 0.05 to 0.09% w/w cross-linking agent. In an embodiment, the gelling composition comprises 0.01 to 0.02% w/w cross-linking agent.

It is possible to improve the durability of the cured hydrogels of the invention by selecting the correct quantity of cross-linking agent within the corresponding gelling compositions. Judicious selection of the quantity of cross-linking agent can also improve fire-resistance properties of said hydrogels.

In a particular embodiment, the cross-linking agent is a cross-linking monomer having two or more unsaturated bonds in the molecule, and monomers such as N-alkoxymethyl(meth)acrylamide derivatives which, after being subjected to polymerization, can form a cross-linked structure by a post-treatment such as heating. Examples of the cross-linkable monomers belonging to the former group are N,N'-methylenebisacrylamide, N,N-diallylacrylamide, triacrylformal, N,N-diacryloylimide, N,Ndimethacryloylimide, ethylene glycol acrylate, ethylene glycol dimethacryalte, polyethylene glycol diacrylates, polyethylene glycol dimefhacrylates, propylene glycol diacrylate, propylene glycol dimethacrylate, polypropylene glycol diacrylates, polypropylene glycol dimethacrylates, 1,3-butylene glycol diacrylate, 1,3-butylene glycol dimethacrylate, 1,4-butylene glycol dimethacrylate, glycerol dimethacrylate, neopentyl glycol dimethacrylate, trimethllolpropane triacrylate, trimethylolpropane trimethacrylate, trimethyloletbane trimethacrylate, trimethyloletbane triacrylate, tetramethylolmethane tetramethacrylate, tetramethylolmethane triacrylate, divinylbenzene, diallyl phthalate, urethane (meth)acrylate, polyester (meth)acrylate and epoxy acrylate. Examples of the N-alkoxymethyl(meth)acrylamide derivatives belonging to the latter group are N-methylol(meth)acrylamide, N-methoxymethyl(meth)acrylamide and N-tertbutoxymethyl(meth)acrylamide and include even N-hydroxymethyl(meth)acrylamide.

In a particular embodiment, the cross-linking agent comprises N,N-methylenebisacrylamide (MBA).

In some embodiments, the gelling composition is free of covalent bonding cross-linking agents. Upon curing, such gelling compositions form polyelectrolyte hydrogels in which di- or tri-valent metal ions form electrostatic cross-links by coordinating with charged groups present in the polymer chains forming the hydrogel matrix. In particular, acidic moieties (or salts/conjugate bases thereof) within the polymer(s), such as carboxylic acid groups, can serve as suitable charged groups for co-ordination with metal cations. Such electrostatic cross-linking may also occur in addition to any covalent cross-linking formed via a cross-linking agent. In a particular embodiment, $Mg^{2+}$ cations provide electrostatic cross-linking.

In some embodiments, gelling compositions are cross-linking by a combination of both covalent bonding cross-linking and the use of divalent or trivalent metal ions to form electrostatic cross-links. In a particular embodiment, N,N- methylenebisacrylamide provides covalent cross-linking whilst $Mg^{2+}$ cations provide electrostatic cross-linking.

Initiators

In particular embodiments, the gelling composition further comprises an initiator.

In some embodiments, the gelling composition further comprises a photoinitiator.

The photoinitiator may suitably facilitate polymerisation upon curing, for instance on exposure to ultraviolet (UV) radiation. Suitable photoinitiators are well known in the art, and the skilled person could readily select any suitable photoinitiator on the basis of water solubility and wavelength of activation. However, photoinitiators from the Irgacure™ range (commercially available from BASF) have been found to be a particularly effective photoinitiators for use with the present invention, especially Irgacure™ 184 which minimises undesirable "yellowing" and is suitable for curing in the presence of some dissolved air.

In another embodiment, the gelling composition comprises a thermoinitiator. Suitable thermoinitiators should have some solubility in the gelling composition these may include but no be limited to potassium persulfate, potassium persulfate and sodium thiosulfate, 4,4-Azobis(4-cyanovaleric acid), 2,2'-Azobis[2-(2-imidazolin-2-yl)propane]dihydrochloride, 2,2'-Azobis[2-(2-imidazolin-2-yl)propane]disulfate dehydrate, 2,2'-Azobis(2-methylpropionamidine) dihydrochloride, 2,2'-Azobis[N-(2-carboxyethyl)-2-methylpropionamidine]hydrate, 2,2'-Azobis{2-[1-(2-hydroxyethyl)-2-imidazolin-2-yl]propane}dihydrochloride, 2,2'-Azobis[2-(2-imidazolin-2-yl)propane], 2,2'-Azobis(1-imino-1-pyrrolidino-2-ethylpropane)dihydrochloride, 2,2'-Azobis{2-methyl-N-[1,1-bis(hydroxymethyl)-2-hydroxyethyl]propionamide}, 2,2'-Azobis[2-methyl-N-(2-hydroxyethyl)propionamide]. Selection of initiator is not only based on solubility but also on half life at a particular polymerisation temperature and at a particular pH.

Where an initiator (especially a photoinitiator) is present within the gelling composition, it suitably comprises 0.001-0.05% w/w of the total gelling composition, more suitably 0.005-0.020% w/w.

Coupling Agent

In some embodiments, the gelling composition additionally comprises a coupling agent to facilitate bonding of the gelling composition, especially the cured gelling composition, to the surface of the transparent panes of the glazing unit.

In some embodiments, the coupling agent is pre-coated onto the contact surface of the transparent panes of the glazing unit prior to the manufacture of the unit, for example, by spray coating prior to the in situ curing of the gelling composition.

In other embodiments the coupling agent is pre-coated onto the contact surface of the transparent panes of the glazing unit after manufacturer of the unit by swilling the coupling agent around within the internal space and subsequently draining out the excess. The advantage of this method is that the spacers are also coated with primer prior to the in situ curing of the gelling composition. However, in some cases it can be expedient to incorporate the coupling agent into the gelling composition itself in order to avoid the need to pre-coat the transparent panes with the coupling agent (see below).

Suitably, the coupling agent is a polymerisable coupling agent which may itself partake in coupling reactions during curing.

For bonding the gel to a glass surface, the coupling agent suitably comprises a silane moiety. Suitably, the coupling agent comprises a silane coupled to a vinyl group. The vinyl group enables the coupling agent to polymerise with vinyl containing monomers or polymers that form the hydrogel forming component and the pendant silane groups bond the resultant hydrogel to the surface of the glass panes.

Non-limiting examples of suitable silanes include vinyltrichorosilane, vinyltrimethoxysilane, vinyltriethoxysilane, vinyltri(2-methoxyethoxy)silane, vinyltriisopropyl silane, vinyltris(tert-butylperoxy)silane, vinyldimethylchlorosilane, vinyldimethoxysilane, vinyldichlorosilane, vinylmethyldimethoxysilane, vinyldiethoxysilane, methacryloxymethyl)methyldimethoxysilane, methacryloxymethyltrimethoxysilane, 3-methacryloxypropyltriacetoxysilane, 3-methacryloxypropyltrimethoxysilane, and vinyltriacetoxysilane.

Particularly suitable silanes include vinyltriethoxysilane, vinyltrimethoxysilane, and 3-methacryloxypropyltrimethoxysilane. Alternatively organic titanates or organic zirconates may be used similarly as described in US4264681.

Where a coupling agent is present within the gelling composition, it suitably comprises 0.01-2% w/w of the total gelling composition.

The Glazing Unit and Processes for its Manufacture

The present invention further provides a glazing unit comprising a first transparent pane and a second transparent pane with an interlayer disposed therebetween, wherein the interlayer is a hydrogel formed by curing a gelling composition as defined herein.

The glazing until is suitably sealed about the perimeter edge by a sealing means to retain the gel layer in place.

The first and second panes may be formed from any suitable transparent material, such as glass or transparent plastic.

The transparent panes are spaced apart from one another such that the respective internal surfaces of the transparent panes face one another, suitably in a substantially parallel manner.

The present invention provides a process for forming a glazing unit as defined herein, the process comprising:
 i) providing a first and a second transparent pane;
 ii) partially assembling the glazing unit such that the first and second transparent panes are spaced apart form one another and a sealing means holds the first and second panes in position; wherein:
  the sealing means comprises an opening; and
  the first and second panes and the sealing means together define an internal space;
 iii) delivering a gelling composition as defined herein into the internal space through the opening in the sealing means;
 iv) closing the opening in the sealing means to provide a sealed internal space; and
 v) curing the gelling composition to provide a hydrogel gel interlayer within the internal space;
wherein the gel is bonded to the inner surfaces of the first and/or second transparent panes either inherently or by either coating at least one of the internal surfaces of the first and/or second panes with a coupling agent prior to step (iii) or incorporating the coupling agent into the gelling composition.

Some or all of steps i) to v) may be carried out simultaneously or sequentially in any suitable order. The skilled person will readily recognise how the sequence of steps can be adapted in different manufacturing methods without departing from the scope of the invention. For instance, steps iv) and v) may be carried out in either order and, in fact, performing step v) first may afford advantages where curing leads to an expansion in volume of the gelling composition.

Moreover, in processes where at least one of the internal surfaces of the transparent panes is coated with a coupling agent prior to step (iii) of the process, the precise stage at which at least one of the internal surfaces is coated with a coupling agent may be at any point prior to step (iii). For instance, the internal surfaces of the first and second panes provided in step (i) may have been pre-coated with the coupling agent, or alternatively the relevant internal surfaces may be coated after the partial assembly in step (ii).

Furthermore, as indicated above, in certain embodiments, the coupling agent may even be a constituent of the gelling composition itself such that coating with the coupling agent proceeds simultaneously with step iii).

In a particular embodiment, steps i)-v) are performed in the sequential order as listed above.

The present invention further provides a glazing unit, wherein the glazing unit is obtainable by, obtained by, or directly obtained by the process as defined herein.

Transparent Panes

As previously indicated, the first and second panes may be formed from any suitable transparent material, such as glass or transparent plastic/polymer sheets.

In an embodiment, the transparent panes are glass panes.

In a particular embodiment, the glass is selected from borosilicate glass, annealed float glass, toughened glass, heat strengthened glass, hard coated glass, soft coated glass, laminated glass or combinations thereof.

In an alternative embodiment, the transparent panes are polycarbonate sheets.

In an alternative embodiment, the transparent panes are composed of a UV transmissive laminated glass.

In an alternative embodiment, the transparent panes are composed of a UV protective laminated glass In an alternative embodiment, the transparent panes are composed of a combination of UV protective laminated glass and UV transmissive glass.

In a particular embodiment, the glass is toughened glass.

Suitably the transparent panes have a thickness between 2 mm and 15 mm.

The transparent panes used in accordance with the invention may be any suitable shape, for instance, square, rectangular, triangular, circular, etc. The transparent panes may be dimensioned to suit the particular application.

In some embodiments, more than two transparent panes may be present in the glazing unit. For instance, first, second, and third transparent panes may be present to produce a "triple-glazing" unit. Suitably, such glazing units are "partially assembled", as per step ii) above, such that the third transparent pane is also secured at its respective edges to the perimeter seal associated with the first and second panes, so as to be spaced apart in an opposed manner from the second pane and define an additional internal space therebetween. This additional internal space may optionally be open, by virtue of an opening in the perimeter seal, so that a cured gelling composition can also be provided within this additional internal space in the same manner as described in relation to the original internal space between the first and second panes (i.e. by following steps ii)-v) in relation to the third pane and optionally coating any additional internal surfaces with a coupling agent as defined herein). Further transparent panes may be arranged likewise, and likewise may optionally comprise a cured gelling composition within any or all of the additional internal spaces they create by implementing steps ii)-v) in relation to the third and any subsequent panes, and optionally coating any additional internal surfaces with a coupling agent as defined herein. Alternatively, one or more of any additional internal space(s) formed by one or more additional transparent panes in the glazing unit may be free of the cured gelling composition of the present invention (i.e. they are left empty, evacuated, or filled with an alternative substance (e.g. gas or alternative gel).

Thus, the glazing unit may comprise one or more further transparent panes optionally with further interlayer(s) in between neighbouring (i.e. directly opposing) transparent panes, wherein said interlayer(s) preferably comprise the hydrogel formed by curing the gelling composition as defined herein. Any further transparent panes may suitably be spaced from neighbouring (i.e. directly opposing) transparent panes by between 1 and 100 mm, preferably by a sealing means comprising a spacer (wherein the spacer is suitably as herein defined).

The Partial Assembly of the Glazing Unit

The partial assembly of the glazing unit in step (ii) of the process involves assembling the glazing unit such that the first and second transparent panes are spaced apart from one another and a sealing means holds and seals the first and second panes together. The sealing means comprises an opening and the first and second panes and the sealing means together define an internal space which can be accessed through the opening in the sealing means.

As discussed above, there will be two internal spaces in a triple glazed unit where a third transparent pane is present.

Suitably the sealing means takes the form of a perimeter seal that extends around the edges of the transparent panes to hold them together.

The opening in the sealing means permits the remaining manufacturing steps to be conveniently performed on the partially assembled glazing unit before appropriate sealing takes place to close and completely seal the internal space.

Examples of a glazing unit assembly processes can be found in WO03/061963 A1 (FLAMRO), WO 2009/071409 (FLAMRO), U.S. Pat. No. 4,164,108 A (SAINT GOBAIN), and U.S. Pat. No. 4,264,681 A (SAINT GOBAIN), all of which are duly incorporate herein by reference.

The partial assembly process may optionally involve producing the opening(s) within the sealing means. The opening(s) may be produced at any point during the partial assembly process, for instance after the assembly process is complete or before the assembly process begins.

Sealing Means

The first and second transparent panes may be suitably spaced apart by a sealing means. The sealing means may suitably comprise a spacer.

The sealing means may be formed from any suitable material. The person skilled in the art will be able to select appropriate materials, adhesives (for securing the peripheral seal to the respective panes of glass), and configurations of the sealing means. Indeed these features may be appropriately selected based on the type of transparent pane, the spacing therebetween, and the shape of the glass.

In an embodiment, the sealing means is a perimeter seal.

The perimeter seal may be a single continuous perimeter seal. Alternatively, the perimeter seal may comprise a plurality of individual perimeter members, suitably connected together to produce the overall perimeter seal. Suitably, some or all of such individual perimeter members are sealingly connected. Suitably, some or all of such individual perimeter members are sealing connected to the relevant transparent panes.

In an embodiment, the transparent panes are rectangular and the perimeter seal comprises a base perimeter member, two side perimeter members, and a top perimeter member. One of said perimeter members may be absent to provide the opening to the internal space or, alternatively, one or more of said perimeter members may comprise one or more openings therein.

Suitably, the perimeter seal comprises a spacer. In a particular embodiment, the perimeter seal comprises a plurality of perimeter members, at least one of which is a spacer. The spacer itself is suitably connected, preferably sealingly connected, to one or more other perimeter members. In a particular embodiment, the perimeter seal comprises two spacers. In an embodiment, the perimeter seal comprises a single continuous spacer which extends around the perimeter, optionally having therein a sealable opening.

Suitably the final glazing unit comprises the peripheral seal. However, in an embodiment, the peripheral seal (or part thereof) is removed once the gelling composition has been self-sealed upon curing. In such an embodiment, the peripheral seal (or part thereof) serves as a temporary containment means for the gelling composition and/or the coupling agent during the manufacture of the glazing unit. As such, the glazing unit may be free of a peripheral seal or alternatively comprise a peripheral seal around only part of the periphery of the glazing unit.

The opening in the sealing means facilitates the ingress and egress of fluids into and from the internal space. For instance, the opening provides a means through which a coupling agent can be introduced into the internal space to pre-coat the internal surfaces of the transparent panes, and also provides a means to drain excess coupling agent solution from the internal space. Likewise, the opening provides an entrance port to the internal space for the delivery of the gelling composition of the invention.

In a particular embodiment, the sealing means comprises one or more openings. Additional openings can facilitate venting during the delivery of the gelling composition through the opening(s). In an embodiment, the spacer(s) comprises one or more openings.

An opening may be produced in the peripheral seal before, during, or after partial assembly of the glazing unit.

Suitably, the spacing between the first and second pane of glass (i.e. the width of the internal space) is between 1 mm and 100 mm (as measured between the opposing internal surfaces). The thickness of the gel determines the duration of the fire resistance. In general, the gelling compositions of the present invention allow for smaller spacing between the glass panes than typical prior art glazing units for a required duration of fire resistance. However, thicker spacing allows for thicker hydrogel interlayers which, in general, provides for improved fire-resistance.

In some embodiments, the first and second transparent panes (and indeed the third and subsequent panes, where relevant) of the glazing unit are separated by a spacer located at the edges of the internal space defined by the opposing transparent panes. Suitably, the spacer abuts or forms a part of the peripheral seal. Suitably the spacer abuts the opposing panes of glass to maintaining spacing therebetween (optionally via one or more intervening sealing members). Preferably the spacer extends from the peripheral seal (with which it abuts or forms a part thereof) into or towards a portion of the internal space.

In a particular embodiment, the glazing unit comprises two or more of the above described spacers. Any or all of the spacer(s) may be form part of the peripheral seal.

The spacer(s) is suitably non-porous. The spacer(s) is suitably solid (i.e. as opposed to hollow). The spacer(s) suitably comprises solid metal or plastics material. The spacer(s) is suitably free of desiccants. The spacer(s) is suitably free of perforation.

At least one spacer suitably comprises one or more sealable openings (optionally corresponding with the "opening in the perimeter seal" described herein), suitably of about 3 mm diameter. The sealable opening(s) may be produced before, during, or after the partial assembly process.

The internal space is a transparent region of the glazing unit located between the opposing transparent panes, and is suitably enclosed either partially (prior to sealing step iv)) or fully (after sealing step iv)) by the sealing means. Multiple internal spaces may be present where three or more panes of glass comprise the glazing unit (e.g. in triple-glazed units).

The internal space and components in contact therewith are suitably free of desiccants to prevent adverse interaction with the hydrogel.

Delivery of the Gelling Composition into the Internal Space

The gelling composition of the invention is sufficiently fluid to allow delivery thereof to the internal space of the partially assembled glazing unit via the one or more openings in the sealing means. The gelling composition suitably has a viscosity which is sufficiently low to permit bubbles to float to the top surface of the gelling composition to allow said bubbles to be removed or vented. The viscosity of the gelling composition is therefore appreciably low preferably between $8.94 \times 10^{-4}$ Pa·s (at 20° C.) (i.e. that of water) and 0.065 Pa·s (at 20° C.) (e.g. that of a low-viscosity oil).

In an embodiment, the gelling composition is poured into the internal space via the one or more openings. In another embodiment, the gelling composition is pumped or injected, optionally under high pressure, into the internal space via the one or more openings. Suitably the gelling composition is delivered through one opening whilst an additional opening serves as a vent.

The gelling composition is suitably delivered so as to completely fill the internal space (i.e. leaving no vacant space in the internal space).

Suitably, the gelling composition is delivered to the internal space as a "degassed" gelling composition. Degassing helps to ensure that no bubbles form within the cured gelling composition which could obscure visibility through the internal space of the glazing unit. Methods of degassing are well known in the art. In a particular embodiment, degassing of the gelling composition involves exposure of the gelling composition to a vacuum, optionally whilst being agitated or otherwise exposed to sonication.

In addition, prior to use in the manufacture of glazing units, the gelling compositions of the present invention are suitably filtered.

Closing the Opening in the Sealing Means

The opening in the sealing means may need to be closed after the gelling composition has been introduced to the internal space. Suitable processes for closing the opening to provide a sealed internal space are well known to the person skilled in the art, and any suitable process for sealing the opening may be used. The perimeter seal is suitably sealed with a sealant, for instance a silicone or polysulphide sealant.

In a particular embodiment, the opening in the sealing means is closed following delivery of the gelling composition to the internal space, and prior to curing of the gelling composition.

In an alternative embodiment, the perimeter seal is closed after the in situ curing of the gelling composition within the internal space.

Curing of the Gelling Composition

Curing of the gelling composition to provide a hydrogel gel interlayer within the internal space of the glazing unit is suitably facilitated by the application thereto of heat and/or radiation. A person skilled in the art is able to recognise when the gelling composition has been suitably cured.

Suitably, curing of the gelling composition can be effected whilst the partially assembled glazing unit is located on an oscillating curing bed in order to ensure an even cure and superior optical quality.

In a particular embodiment, the gelling composition is cured through exposure to ultraviolet (UV) radiation. In a particular embodiment the gelling composition is cured by exposure to 200 W (Watt) UV lamps. The UV radiation is suitably of a wavelength appropriate to the initiator used.

The Cured Gelling Composition

The cured gelling composition is hydrogel interlayer formed between the first and second transparent panes.

Upon curing of the gelling composition, the hydrogel-forming component forms a true hydrogel. As such, the cured gelling composition is suitably characterised as a hydrogel.

In an embodiment, the hydrogel comprises polymerisation adducts of monomeric units comprised of the initial hydrogel-forming component.

In an embodiment, the hydrogel comprises cross-linked adducts of polymeric units either present in the hydrogel-forming component or present following curing of the hydrogel-forming component (i.e. polymerisation adducts of monomeric units comprised of the initial hydrogel-forming component).

In a particular embodiment, the hydrogel comprises both the polymerisation adducts and cross-linked adducts as above described.

Cross-linking of or within polymeric units may suitably involve covalent cross-linking (i.e. via a cross-linking agent) and/or electrostatic cross-linking (i.e. where ions of metal salts co-ordinate with adjacent polymeric units or adjacent portions of an individual polymer unit). In a particular embodiment, both covalent and electrostatic cross-linking occurs.

Most suitably, cross-linking, whether covalent or electrostatic or both, occurs upon curing the gelling composition.

Coupling Agent and the Coating Therewith of the Internal Surfaces of the Transparent Panes The purpose of the coupling agent is to ultimately adhere the cured gelling composition to the internal surfaces of the panes within the internal space should the cured gelling composition possess ineffective inherent bonding capability.

Suitably, all internal surfaces (e.g. glass surfaces which face inwards towards the internal space) intended for contact with the cured gelling composition are coated with the coupling agent, optionally including any relevant internal surfaces of the third and subsequent panes of glass.

Suitably the surface(s) to be coated with the coupling agent (i.e. the "internal surface(s)") is pre-cleaned prior to coating with the coupling agent. In a particular embodiment, the surface(s) to be coated are pre-cleaned or pre-washed with an acidic solution to suitably activate the surface(s).

Coating of at least one of the internal surfaces with a coupling agent may be performed at a variety of stages during the process of the present invention.

In an embodiment, the internal surface of one or more of the panes of glass provided in step (i) is pre-coated (e.g. spray-coated). In such a case, suitably all internal surfaces are pre-coated. Such pre-coating may involve spreading the coupling agent (or a composition thereof) over an internal surface. Such spreading may be effected in a variety of ways well known to those skilled in the art. The pre-coating may involve removing excess coupling agent (or a composition thereof). The pre-coating may involve a drying step to remove some or all of any residual solvents. The pre-coating may involve a curing step to bond the coupling agent to the internal surface. Such curing may involve exposure to heat and/or radiative energy (e.g. UV), most suitably heat.

In another embodiment, the internal surface of one or more of the panes of glass provided in step (i) is coated following partial assembly of the glazing unit (i.e. after step ii)). Suitably, all internal surfaces are so coated. In this embodiment, the coupling agent (or composition thereof) is suitably delivered into the internal space via the opening in the peripheral seal. Suitably the partially assembled glazing unit is moved (e.g. tilted) so as to spread the coupling agent over the internal surfaces of the first and second panes (or third and subsequent panes where relevant). Suitably, once the internal surfaces of the first and second panes are coated with coupling agent, any excess coupling agent (or composition thereof) is removed via the opening in the peripheral seal (i.e. the excess coupling agent is drained from the internal space). Optionally, the internal surfaces are further rinsed, suitably by delivering a rinsing solvent to the internal space and duly eluting the internal surfaces with the rinsing solvent before removing the rinsing solvent from the internal space (suitably using the opening in the peripheral seal as aforedescribed). Curing of the coupling agent may suitably be effected to bond the coupling agent to the internal surface. Such curing may involve exposure to heat and/or radiative energy (e.g. UV), most suitably heat. This methodology may be considered advantageous as the internal space of the partially assembled glazing unit serves as a temporary container for the coupling agent whilst the internal surface(s) are coated, thus facilitating handling during manufacture.

In another embodiment, the coupling agent is present in the gelling composition itself. In such an embodiment, the one or more panes of glass provided in step i) may be pre-treated with the coupling agent-containing gelling composition as described above. Alternatively, the internal surface of one or more of the panes of glass may be coated following partial assembly of the glazing unit in the manner described above (i.e. by delivering a quantity of the coupling agent-containing gelling composition to the internal space, moving the glazing unit to spread the gelling composition over the internal surface(s), optionally removing excess gelling composition, and optionally curing to bond the coupling agent to the internal surface(s)).

However, in a particularly embodiment, where the coupling agent is comprised of the gelling composition, there is no pre-coating of the internal surface(s) with the coupling agent prior to delivering the gelling composition to the internal space as per step (iii). As such, coating with the coupling agent and delivery of the gelling composition may suitably take place simultaneously during step iii). Furthermore, curing of the coupling agent and gelling composition may also take place simultaneously during step iv).

Suitably, the coupling agent is cured so as to bond the coupling agent to the internal surface(s) prior to delivery of the gelling agent to the internal space.

Coupling Agent and Compositions Thereof.

The nature of the coupling agent has been described above in relation to the gelling composition. Preferably, however, the coupling agent is not provided within the gelling composition, but is instead provided as a distinct coupling agent composition.

A coupling agent composition suitably comprises the coupling agent and one or more solvents. Preferably, the coupling agent composition is an aqueous composition, though in some embodiments the coupling agent composition may be an organic solution, or an aqueous/organic solution of the coupling agent.

The Glazing Unit in Use

The glazing units of the present invention may be suitably fixed within a further external window frame.

As such, the present invention provides a window comprising one or more glazing units as described herein. Furthermore, the present invention also provides a building or vehicle comprising one or more windows in accordance with the present invention.

Glazing units of the present invention perform extremely well in the containment of fires on one side of the glazing unit. For instance, the cured gelling composition in the internal space of the glazing units insulates to retard heat transfer from the "fire-side" of the glazing unit to the "cold-side" eventually forming an appreciably solid crust thus maintaining integrity of the glazing unit and offering significant radiation reduction.

Suitably the gelling composition may be used to provide a fire-resistant barrier and/or a radiation barrier.

EXAMPLES

Embodiments of the present invention, and relevant tests performed thereon, are now described in detail. It will be understood by those skilled in the art that the invention is not limited by the examples which follow, and that the examples support the broader applicability of the invention.

The Glazing Unit

An embodiment of a glazing unit in accordance with the invention is illustrated in FIG. 1, which shows a cross-sectional view of a fire-resistant glazing unit. The glazed unit 10 has two parallel opposed rectangular panes of glass 1 separated at their peripheries by a spacer 2; an internal space 3 enclosed by the two opposed panes of glass 1 and the spacer 2; a cured hydrogel interlayer 3 filling the internal space 3; a secondary seal 4 comprising a suitable adhesive, such as polysulfide or a hot melt sealant, and a primary seal 5 comprising a suitable adhesive, such as butyl or an acrylic tape adhesive.

Each pane of glass 1 is typically toughened glass or float glass (see later specific examples), each having a thickness of between 3 and 20 mm (typically 4-6 mm thick—see later specific examples).

In the examples which follow, the spacer 2 consists of a single continuous piece which is bent into shape (i.e. substantially forming a rectangle). In alternative examples, the spacer consists of four separate pieces, one for each side of the rectangle. In the examples which follow, the spacers are made from metal or plastics material (see specific examples), and are 6-10 mm thick (see later specific examples).

The spacer 2, together with the primary 5 and secondary 4 seals, may be considered to form a peripheral seal around the glazed unit.

The spacers 2 used in the present examples differ from those known in the art in that:

solid (metal or plastic) spacers are used instead of hollow spacers;
the spacers used have no perforations;
the spacers used do not contain desiccant;
the spacers have an entrance hole suitable to facilitate filling with the gelling composition.

General Method of Preparing a Gelling Composition

Gelling compositions of the present invention are suitably intended for injection into the internal space 3 for subsequent curing in situ to form the cured gel (or hydrogel) 3 described above. Embodiments of the pre-cured gelling compositions are described below, and contain various mixtures of ingredients, including water, one or more salts, and a hydrogel-forming monomer. Such gelling compositions are produced by mixing all the ingredients and suitably agitating at an appropriate temperature for sufficient time to produce a substantially clear, transparent solution. The gelling compositions are typically filtered and degassed prior to use.

General Method of Preparing the Glazing Unit

Glazed units 10, as described above, are prepared substantially in accordance with standard methods known in the art (e.g. U.S. Pat. No. 2,213,468, U.S. Pat. No. 3,759,771, U.S. Pat. No. 2,389,360), albeit with the variations described below.

Partial Assembly of Glazed Unit

In the present example, the glazed unit is partially assembled to include all but the cured gel 3 and primary seal 5. As such, the entrance holes (not shown) in the spacers provide access to the internal space 3 for the delivery of the pre-cured gelling composition.

Priming of the Glass

Prior to injection of the gelling composition, the internal surfaces of the panes of glass 1 (i.e. those facing each other and in contact with the internal space 3) are treated with a polymerisable coupling agent (e.g. vinyltriethylsilane, vinyltrimethylsilane or 3-methacryloxypropyltrimethoxy silane) to facilitate bonding between the panes of glass 1 and the cured gel 3. To this end, an aqueous/organic solution of the silane was injected through one of the entrance holes in the spacer, and the partially assembled glazed unit tilted and moved to ensure that all internal surfaces of the glass 2 are duly coated. The silane solution is then drained from the entrance holes before the internal space is rinsed with a rinsing solvent using the same injection, tilting/moving, and draining method. Finally, the coated surfaces are left at room temperature for 30 mins to allow the coating to bond to the surfaces. It will be understood by the skilled person that alternative coating methods may be employed, including applying the silane to the relevant surface as a spray.

Injection of the Gelling Composition

The gelling composition (examples of which are set forth in the examples which follow) is filtered and degassed (e.g. via simultaneous sonication and evacuation) before being pumped into the internal space 3 via one of the entrance holes in the spacer 2. Once the internal space 3 is completely filled with gelling composition, a primary seal 5 is secured to cover the entrance holes in the spacer 2 and duly close the internal space.

Curing of the Gelling Composition

The gelling composition within the internal space 3 is then cured in situ through appropriately irradiating the glazed unit upon an oscillating curing bed for a sufficient period of time (typically 15 minutes) with UV light (typically provided by 200 Watt UV lamps with a wavelength maxima of approximately 350 nm).

Testing Protocols

Primary Testing

Gel compositions were assessed by the following primary criteria that a candidate gel be optically clear and free from haze by visual inspection; and that the gel demonstrates intumescence when placed under the flame of a burner.

Secondary Testing

Low Temperature Durability Tests

Hydrogel-filled glazing units were each placed in freezer units held at 5° C., −12° C. and −20° C. respectively; and defects were recorded periodically.

High Temperature Durability Tests

Filled units were each stored in a ventilated oven at 50° C. and defects were recorded periodically. In addition, filled units were subjected to the EN ISO 12543-4 standard durability test which involves storing each sample at 100° C. for 2 hours REF: EN ISO 12543-4:1998, Laminated glass and laminated safety glass—Part 4: Test methods for durability.

Tertiary Testing

Fire Test

With a view to meeting or exceeding the European standard EI 30 classification filled units of gel formulation were glazed in a steel reusable frame unless otherwise stated using ceramic tape glazing media (unless otherwise stated) to prevent contact of the glass with the frame, and were each subjected to an indicative EN cellulosic fire resistance test at Exova (Warrington) REF: EN 1364-1:1999, Fire resistance tests for non-loadbearing elements—Part 1: Walls. As per the standard; the cold side temperatures are measured by thermocouples that are adhered to the non-exposed face of the glazing and by a roving hand-held plate thermocouple. Radiation emission levels from the furnace through the glazing sample are measured using a water-cooled heat flux radiometer positioned central to the sample.

Cone Test 1 or 2 mm thick gels were cast onto 5 mm thick float glass squares measuring 100 mm×100 mm. These were each subjected to heating under a modified cone calorimeter heater to enable approximation of exposure to the EN cellulosic fire resistance test (Using a Modified Cone calorimeter to Predict the Performance of a Thermally Reactive Glazing System in a Furnace Test, V. Crook, A. Napier, H. N. Phylaktou, J. E. J. Staggs; 12$^{th}$ European Meeting on FRPM'09 Poznan, Poland (2009)) and viewing of both the cold and hot face of the sample throughout the test. The cold side temperatures were also recorded throughout the tests using thermocouples adhered to the non-exposed face of the glass.

SPECIFIC EXAMPLES

The following examples are embodiments of gelling compositions of the invention. Each gelling composition was prepared as described and subsequently incorporated into glazing units, using the above described methods, to provide glazing units containing the relevant cured gels within their internal spaces. Each glazing unit was then tested, using the above described test protocols, the results of which are presented below alongside a description of the corresponding gelling compositions and also in the Summary section which follows the Examples. When glass is referred to with the notation x/y/z, this refers to the thicknesses of the glass/interlayer/glass respectively.

Example 1—Gelling Composition 1 (GC1)

A gelling composition (GC1) was prepared using the ingredients listed below:

| Ingredient | M.W. | % w/w | Supplier |
|---|---|---|---|
| Water | 18 | 51.387 | |
| MgSO4•7H2O (Magnesia 4281) | 246.47 | 31.000 | Magnesia Ltd, Luneburgh |
| Acrylic Acid | 72.06 | 7.000 | Merck Chemicals |
| Acetic Acid | 60.05 | 7.430 | Merck Chemicals |
| Magnesium Oxide, low iron (Magnesia 298) | 40.3 | 3.160 | Magnesia Ltd, Luneburgh |
| Irgacure 184 | 204.3 | 0.009 | Ciba speciality Chemicals |
| N,N'-Methylenebisacrylamide | 154.17 | 0.014 | Merck Chemicals |

A flask fitted with an agitator was charged with MgSO4.7H$_2$O (31 g) and 51.387 g of distilled water. A clear aqueous solution was obtained after stirring for 10 minutes. To this clear aqueous solution was added acetic acid (7.43 g), acrylic acid (7 g), N,N'-Methylenebisacrylamide (0.014 g) and Irgacure 184 (0.009 g) and the mixture was allowed to stir until a clear solution obtained. Finally 3.16 g of MgO was added. The resultant turbid milky suspension was stirred for 2 hours at 40° C. to obtain a clear solution.

The solution was allowed to cool, and was subsequently stored at room temperature.

The gelling composition (GC1) was measured to have a pH of 4.20 prior to gelling. The pH was measured by immersing the probe of a pH meter in the solution.

Test Results for GC1

The cured gel was found to be appreciably optically clear and was seen to intumesce considerably upon application of a flame from a burner.

The gel was found not to be sufficiently stable in low temperature durability tests.

The gel was found not to be sufficiently stable in high temperature durability tests.

In Cone testing the gel layer exhibited expansion of a 2 mm gel layer to approximately 50 mm. 1 mm gel expanded to approximately 40 mm.

Figure 2:
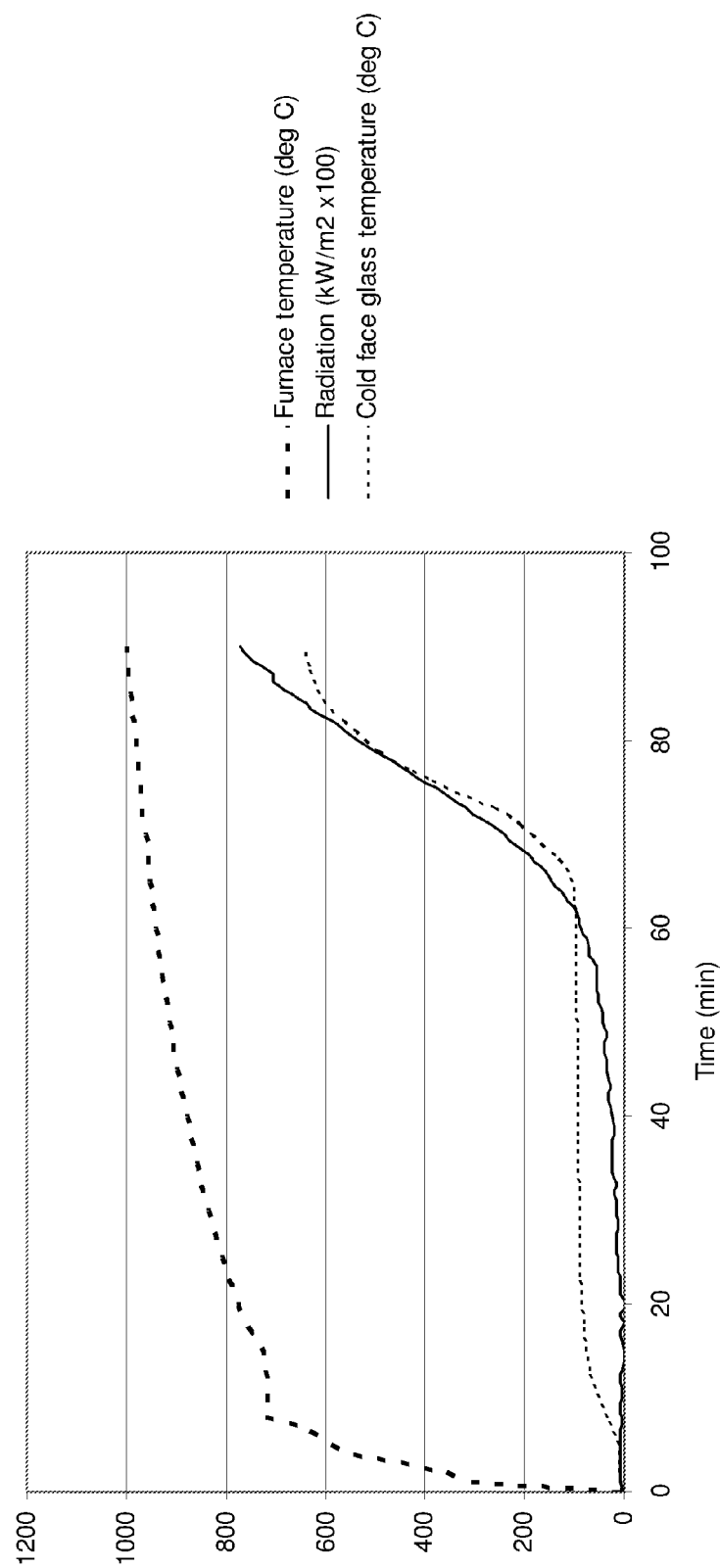
FIG. 2 is a graph showing how various perameters change with time during the fire test on a glazing unit having an interlayer of cured gelling composition GC1, particularly parameters such as furnace temperature (thick dotted line), the "cold-face glass temperature" (thin dotted line), and the radiation (solid line)

When fire-tested in the form 4/8/4, toughened glass, using neat vinyltriethylsilane as the primer (i.e. coupling agent) at pane size 800 mm×1200 mm, in a steel reusable frame, the sample met the EI 30 criteria for insulation and the EW 60 criteria for radiation reduction. FIG. 2 is a graph showing how various perameters change with time during the fire test, particularly furnace temperature (thick dotted line), the "cold-face glass temperature" (thin dotted line), and the radiation (solid line).

Example 2—Gelling Composition 2 (GC2)

A gelling composition (GC2) was prepared using the ingredients listed below:

| Ingredient | M.W. | % w/w | Supplier |
|---|---|---|---|
| Water | 18 | 51.514 | |
| MgSO4•7H2O (Magnesia 4281) | 246.47 | 18.000 | Magnesia Ltd, Luneburgh |
| Acrylic Acid | 72.06 | 10.000 | Merck Chemicals |
| Magnesium Oxide, low iron (Magnesia 298) | 40.3 | 2.450 | Magnesia Ltd, Luneburgh |
| Irgacure 184 | 204.3 | 0.014 | Ciba speciality Chemicals |
| N,N'-Methylenebisacrylamide | 154.17 | 0.022 | Merck Chemicals |
| Magnesium acetate tetrahydrate | 214.46 | 18.000 | Sigma |

A flask fitted with an agitator was charged with MgSO4.7H2O (18 g) and magnesium acetate tetrahydrate (18 g) and 51.514 g of distilled water. A clear aqueous solution was obtained after stirring for 10 minutes. To this clear aqueous solution were added acrylic acid (10 g), N,N'-Methylenebisacrylamide (0.022 g) and Irgacure 184 (0.014 g) and the mixture was allowed to stir until a clear solution obtained. Finally 2.45 g of MgO was added. The resultant turbid milky suspension was stirred for 2 hours at 40° C. to obtain a clear solution.

The solution was allowed to cool, and was subsequently stored at room temperature.

The gelling composition (GC2) was measured to have a pH of 5.03 prior to gelling.

Test Results for GC2

The cured gel was found to be appreciably optically clear and was seen to intumesce considerably upon application of a flame from a burner.

The gel was found to be sufficiently stable in low temperature durability tests.

The gel was found to be sufficiently stable in the 50° C. oven and the 100° C. durability tests In Cone testing a 1 mm gel layer exhibited expansion to 4 mm.

When fire-tested using neat vinyltriethylsilane as the primer at pane size 800 mm×1200 mm, in a steel reusable frame, in the form 4/8/4 using toughened glass, the sample met the EI 30 criteria for insulation.

Example 3—Gelling Composition 3 (GC3)

A gelling composition (GC3) was prepared using the ingredients listed below:

| Ingredient | M.W. | % w/w | Supplier |
|---|---|---|---|
| Water | 18 | 51.276 | |
| MgSO$_4$•7H$_2$O (Magnesia 4281) | 246.47 | 20.000 | Magnesia Ltd, Luneburgh |
| Acrylic Acid | 72.06 | 7.000 | Merck Chemicals |
| Magnesium Oxide, low iron (Magnesia 298) | 40.3 | 1.700 | Magnesia Ltd, Luneburgh |
| Irgacure 184 | 204.3 | 0.009 | Ciba speciality Chemicals |
| N,N'-Methylenebisacrylamide | 154.17 | 0.015 | Merck Chemicals |
| Magnesium acetate tetrahydrate | 214.46 | 20.000 | Sigma |

A flask fitted with an agitator was charged with MgSO4.7H2O (20 g) and Magnesium acetate tetrahydrate (20 g) and 51.2760 g of distilled water. A clear aqueous solution was obtained after stirring for 10 minutes. To this clear aqueous solution were added acrylic acid (7 g), N,N'-Methylenebisacrylamide (0.015 g) and Irgacure 184 (0.009 g) and the mixture was allowed to stir until a clear solution obtained. Finally 1.7 g of MgO was added. The resultant turbid milky suspension was stirred for 2 hours at 40° C. to obtain a clear solution.

The solution was allowed to cool, and was subsequently stored at room temperature.

The gelling composition (GC3) was measured to have a pH of 5.30 before gelling.

Test Results for GC3

The cured gel was found to be appreciably optically clear and was seen to intumesce considerably upon application of a flame from a burner.

The gel was found to be sufficiently stable in low temperature durability tests.

The gel was found to be sufficiently stable in the 50° C. high temperature durability tests but did not pass the 100° C. oven test.

In cone testing the gel layer exhibited expansion of a 5 mm gel layer to approximately 40 mm at which point the test was terminated.

Fire Tests using neat vinyltriethylsilane as the primer: 4/8/4 at pane size 500 mm×500 mm, using toughened glass, passed EI 30 classification of fire resistance.

Figure 3:
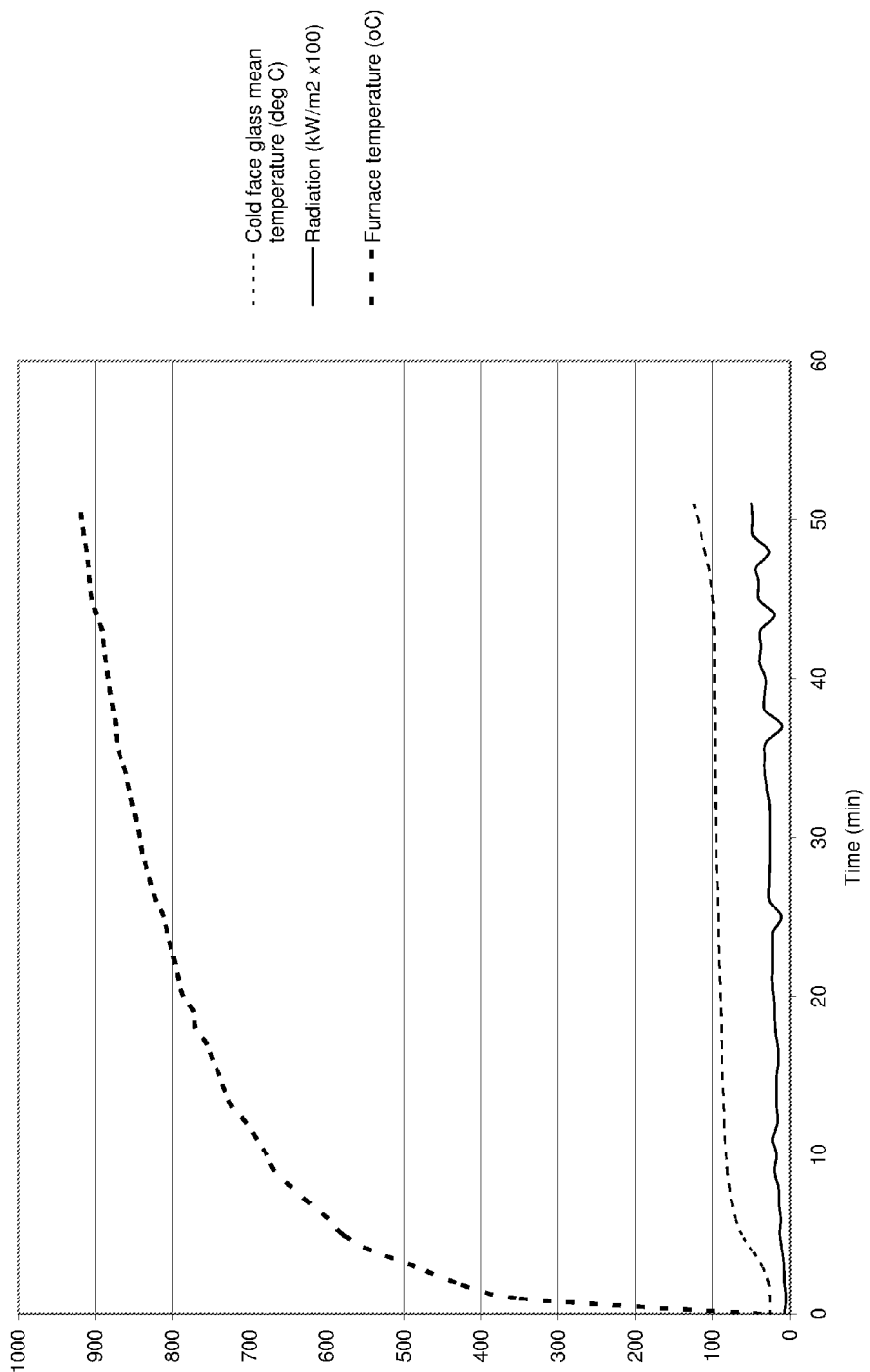
FIG. 3 is a graph showing how various perameters change with time during the fire test on a glazing unit having an interlayer of cured gelling composition GC3, particularly parameters such as furnace temperature (thick dotted line), the "cold-face glass temperature" (thin dotted line), and the radiation (solid line)

Fire Tests using neat vinyltriethylsilane as the primer: 4/8/4 at pane size 800 mm×1200 mm, in a steel reusable frame, passed EI 30 and EW 60 classifications of fire resistance. FIG. 3 is a graph showing how various perameters change with time during this fire test, particularly furnace temperature (thick dotted line), the "cold-face glass temperature" (thin dotted line), and the radiation (solid line).

Figure 4:
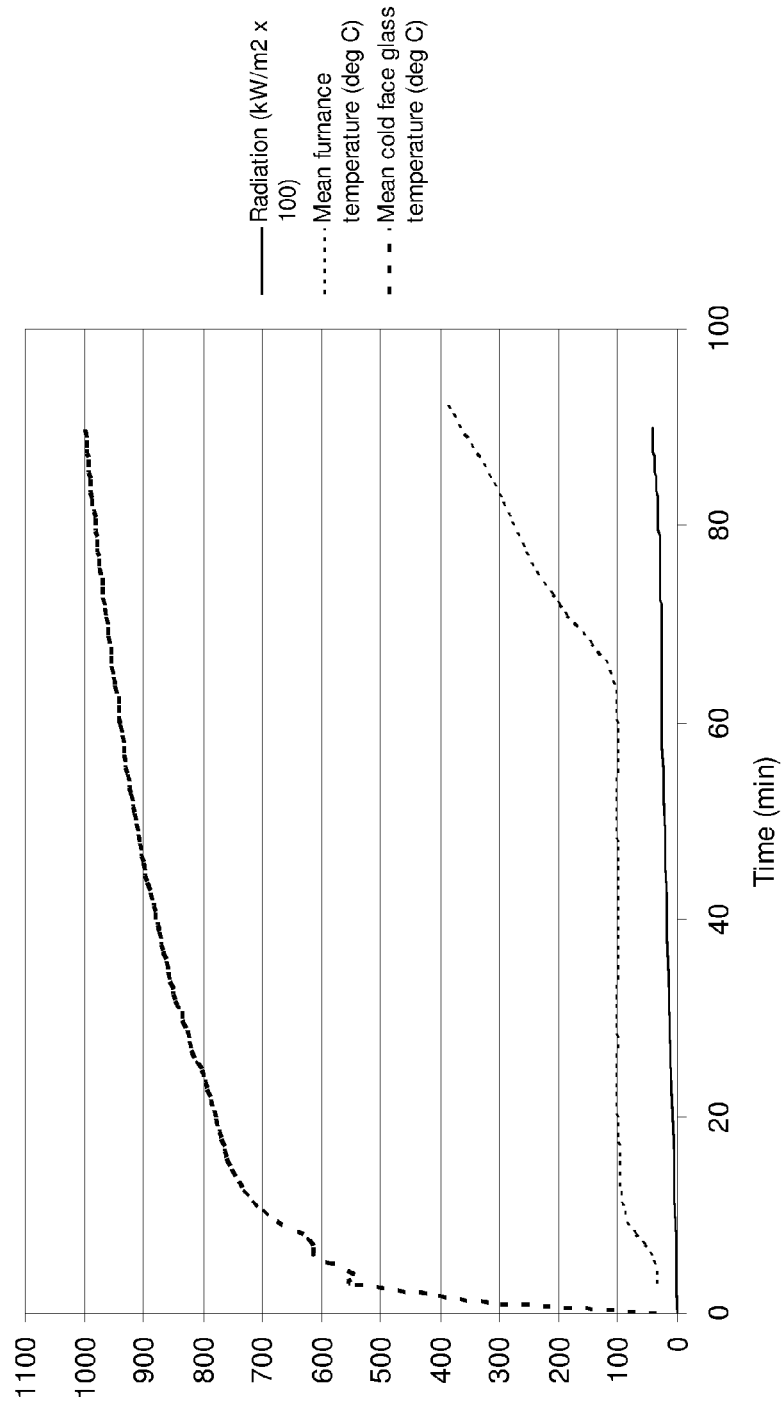
FIG. 4 is a graph showing how various perameters change with time during a further fire test on a glazing unit having an interlayer of cured gelling composition GC3, particularly parameters such as mean furnace temperature (thin dotted line), the "mean cold-face glass temperature" (thick dotted), and the radiation (solid line)

Furthermore a fire test using neat vinyltriethylsilane as the primer was conducted in a timber frame with a glass pane measuring 1390 mm×1390 mm 4/8/4 in timber frame. As those skilled in the art will know; the framing material affects the unit performance. In this case the sample passed EI 60 and EW 90. FIG. 4 is a graph showing how various perameters change with time during this fire test, particularly mean furnace temperature (thin dotted line), the "mean cold-face glass temperature" (thick dotted line), and the radiation (solid line).

Furthermore the capability of 10 mm of gel was established in a 4/10/4 toughened glass unit. As those skilled in the art will be aware; utilising a thicker interlayer often improves the fire performance of a fire resistant unit. This was prepared using neat vinyltriethylsilane as the primer. The sample achieved EI 60.

Furthermore the capability of 6 mm of gel was established in a 4/6/4 Float glass unit again this was prepared using neat vinyltriethylsilane as the primer. As those skilled in the art will be aware; the type of glass utilised will affect the unit performance. The sample achieve EI 30

Example 5—Gelling Composition 5 (GC5)

A gelling composition (GC5) was prepared using the ingredients listed below:

| Ingredient | M.W. | % w/w | Supplier |
|---|---|---|---|
| Water | 18 | 55.643 | |
| MgSO4•7H2O (Magnesia 4281) | 246.47 | 13.000 | Magnesia Ltd, Luneburgh |
| Acrylic Acid | 72.06 | 7.000 | Merck Chemicals |
| Acetic Acid | 60.05 | 4.000 | Merck Chemicals |
| Magnesium Oxide, low iron (Magnesia 298) | 40.3 | 3.333 | Magnesia Ltd, Luneburgh |
| Irgacure 184 | 204.3 | 0.009 | Ciba speciality Chemicals |
| N,N'-Methylenebisacrylamide | 154.17 | 0.015 | Merck Chemicals |
| Magnesium acetate tetrahydrate | 214.46 | 17.000 | Sigma |

A flask fitted with an agitator was charged with MgSO4.7H$_2$O (13 g), magnesium acetate tetrahydrate (17 g) and 55.643 g of distilled water. A clear aqueous solution was obtained after stirring for 10 minutes. To this clear aqueous solution were added acetic acid (4.00 g), acrylic acid (7 g), N,N'-Methylenebisacrylamide (0.015 g) and Irgacure 184 (0.009 g) and the mixture was allowed to stir until a clear solution obtained. Finally 3.33 g of MgO was added. The resultant turbid milky suspension was stirred for 2 hours at 40° C. to obtain a clear solution.

The solution was allowed to cool, and was subsequently stored at room temperature.

The gelling composition (GC5) was measured to have a pH of 5.25.

Test Results for GC5

The cured gel was found to be appreciably optically clear and was seen to intumesce considerably upon application of a flame from a burner.

The gel was found to be sufficiently stable in low temperature durability tests.

The gel was found to be sufficiently stable in the 50° C. high temperature durability tests but did not pass the 100° C. oven test.

In cone testing the gel layer exhibited expansion of a 1 mm gel expanded to approximately 11-12 mm.

Example 6—Gelling Composition 6 (GC6)

A gelling composition (GC6) was prepared using the ingredients listed below:

| Ingredient | M.W. | % w/w | Supplier |
|---|---|---|---|
| Water | 18 | 52.707 | |
| MgSO4•7H2O (Magnesia 4281) | 246.47 | 12.6700 | Magnesia Ltd, Luneburgh |
| Acrylic Acid | 72.06 | 12.0000 | Merck Chemicals |
| Magnesium Oxide, low iron (Magnesia 298) | 40.3 | 2.5800 | Magnesia Ltd, Luneburgh |
| Irgacure 184 | 204.3 | 0.0170 | Ciba speciality Chemicals |
| N,N'-Methylenebisacrylamide | 154.17 | 0.0260 | Merck Chemicals |
| Magnesium acetate tetrahydrate | 214.46 | 20.0000 | Sigma |

A flask fitted with an agitator was charged with MgSO4.7H$_2$O (12.67 g), magnesium acetate tetrahydrate (20 g) and 52.707 g of distilled water. A clear aqueous solution was obtained after stirring for 10 minutes. To this clear aqueous solution was added acrylic acid (12 g), N,N'-Methylenebisacrylamide (0.026 g) and Irgacure 184 (0.017 g) and the mixture was allowed to stir until a clear solution obtained. Finally 2.58 g of MgO was added. The resultant turbid milky suspension was stirred for 2 hours at 40° C. to obtain a clear solution.

The solution was allowed to cool, and was subsequently stored at room temperature.

The gelling composition (GC6) was measured to have a pH of 4.83 prior to gelling.

Test Results for GC6

The cured gel was found to be appreciably optically clear and was seen to intumesce considerably upon application of a flame from a burner.

The gel was found to be sufficiently stable in low temperature durability tests.

The gel was found to be sufficiently stable in the 50° C. high temperature durability tests and passed the 100° C. oven test.

In cone testing the gel layer exhibited expansion of a 1 mm gel expanded to 3-4 mm.

When fire-tested in the form 4/8/4 using toughened glass at pane size 800 mm×1200 mm, using 3-methacryloxypropyltrimethoxy silane applied as a dilute solution in ethanol as the coupling agent, in a steel reusable frame, the sample met the EI 30 criteria for insulation.

When fire-tested in the form 6/8/6 using toughened glass at pane size 1395 mm×2885 mm, using 3-methacryloxypropyltrimethoxy silane applied as a dilute solution in ethanol as the coupling agent, in a timber frame the sample met the EI 30 criteria for insulation and EW 60 criteria for radiation reduction. This test was conducted at Chiltern International Fire Ltd.

Example 7—Gelling Composition 7 (GC7)

A gelling composition (GC7) was prepared using the ingredients listed below:

| Ingredient | M.W. | % w/w | Supplier |
|---|---|---|---|
| Water | 18 | 51.8627 | |
| MgSO4•7H2O (Magnesia 4281) | 246.47 | 12.000 | Magnesia Ltd, Luneburgh |
| Acrylic Acid | 72.06 | 6.600 | Merck Chemicals |
| Magnesium Oxide, low iron (Magnesia 298) | 40.3 | 1.5133 | Magnesia Ltd, Luneburgh |
| Irgacure 184 | 204.3 | 0.009 | Ciba speciality Chemicals |
| N,N'-Methylenebisacrylamide | 154.17 | 0.015 | Merck Chemicals |
| Magnesium acetate tetrahydrate | 214.46 | 5.000 | Sigma |
| MgCl$_2$•6H$_2$O | 214.46 | 23.000 | Sigma |

A flask fitted with an agitator was charged with MgSO4.7H$_2$O (12 g), magnesium acetate tetrahydrate (5 g), Magnesium chloride hexahydrate (23 g) and 51.8627 g of distilled water. A clear aqueous solution was obtained after stirring for 10 minutes. To this clear aqueous solution were added acrylic acid (6.6 g), N,N'-Methylenebisacrylamide (0.015 g) and Irgacure 184 (0.009 g) and the mixture was allowed to stir until a clear solution obtained. Finally 1.51 g of MgO was added. The resultant turbid milky suspension was stirred for 2 hours at 40° C. to obtain a clear solution.

The solution was allowed to cool, and was subsequently stored at room temperature.

The solution was allowed to cool, and was subsequently stored at room temperature.

The gelling composition (GC7) was measured to have a pH of 4.5

Test Results for GC7

The cured gel was found to be appreciably optically clear and was seen to intumesce considerably upon application of a flame from a burner.

The gel was found to be sufficiently stable in low temperature durability tests.

The gel was found to be sufficiently stable in the 50° C. high temperature durability tests and passed the 100° C. oven test.

Figure 5:
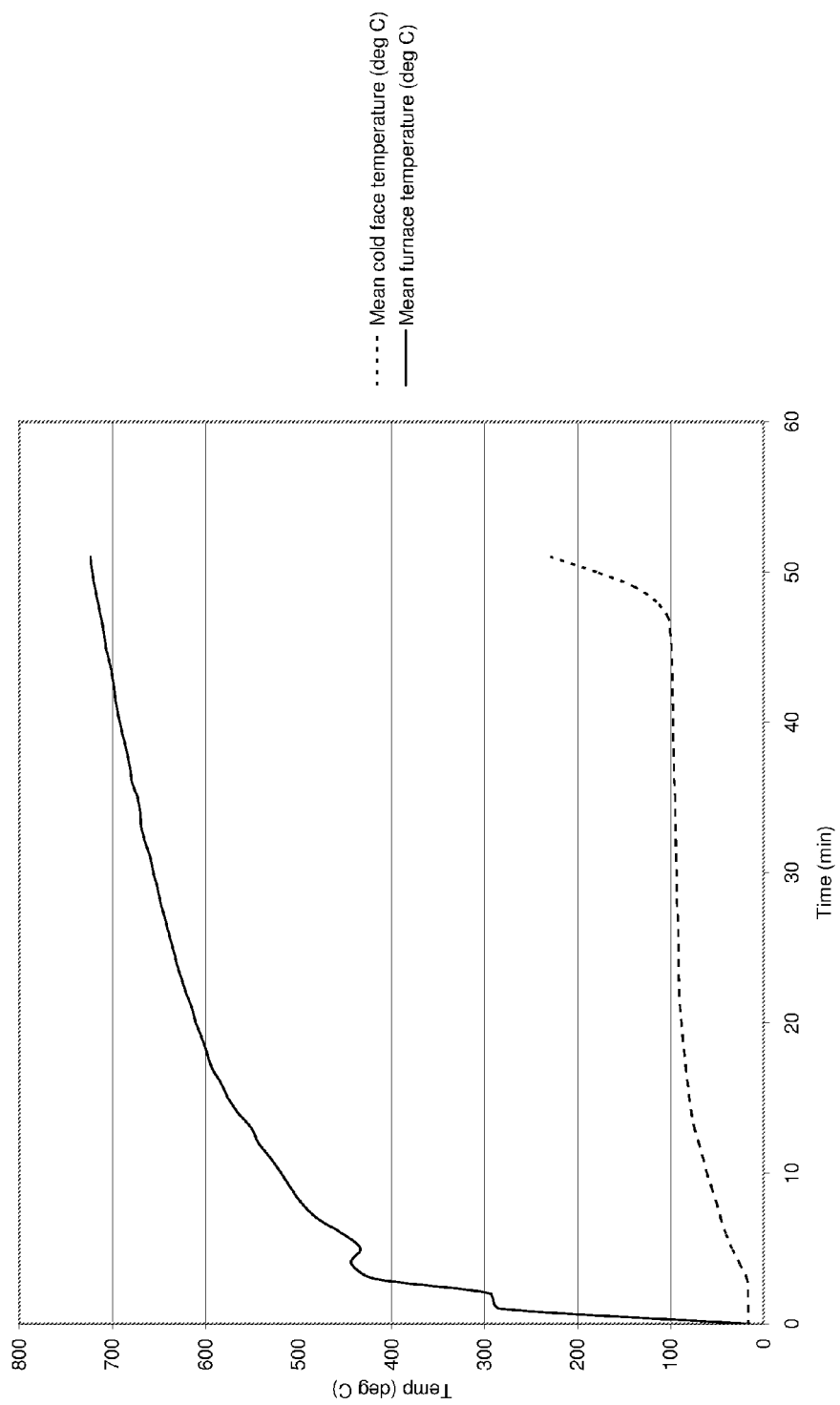
FIG. 5 is a graph showing how various perameters change with time during the fire test on a glazing unit having an interlayer of cured gelling composition GC7, particularly parameters such as mean furnace temperature (solid line), the mean cold side temperature" (dotted line).

When fire tested in the form 4/8/4 using toughened glass at pane size 510 mm×580 mm, in a steel reusable frame, the sample met the EI 30 criteria for insulation. FIG. 5 is a graph showing how various perameters change with time during this fire test, particularly mean furnace temperature (solid line), and the mean cold side temperature" (dotted line).

Example 8—Gelling Composition 8 (GC8)

A gelling composition (GC8) was prepared using the ingredients listed below:

| Ingredient | M.W. | % w/w | Supplier |
|---|---|---|---|
| Water | 18 | 51.734 | |
| MgSO4•7H2O (Magnesia 4281) | 246.47 | 18.000 | Magnesia Ltd, Luneburgh |
| Acrylic Acid | 72.06 | 10.000 | Merck Chemicals |
| Magnesium Oxide, low iron (Magnesia 298) | 40.3 | 2.230 | Magnesia Ltd, Luneburgh |
| Irgacure 184 | 204.3 | 0.014 | Ciba speciality Chemicals |
| N,N'-Methylenebisacrylamide | 154.17 | 0.022 | Merck Chemicals |
| Magnesium acetate tetrahydrate | 214.46 | 18.000 | Sigma |

A flask fitted with an agitator was charged with MgSO4.7H$_2$O (18 g), magnesium acetate tetrahydrate (18 g) and 51.734 g of distilled water. A clear aqueous solution was obtained after stirring for 10 minutes. To this clear aqueous solution were added acrylic acid (10 g), N,N'-Methylenebisacrylamide (0.022 g) and Irgacure 184 (0.014 g) and the mixture was allowed to stir until a clear solution obtained. Finally 2.23 g of MgO was added. The resultant turbid milky suspension was stirred for 2 hours at 40° C. to obtain a clear solution.

The solution was allowed to cool, and was subsequently stored at room temperature.

The gelling composition (GC8) was measured to have a pH of 4.83 prior to gelling.

Test Results for GC8

The cured gel was found to be appreciably optically clear and was seen to intumesce considerably upon application of a flame from a burner.

The gel was found to be sufficiently stable in low temperature durability tests.

The gel was found to be sufficiently stable in the 50° C. high temperature durability tests and passed the 100° C. oven test.

In cone testing the gel layer exhibited expansion of a 1 mm gel expanded to 2-3 mm.

When fire-tested in the form 4/6/4 using toughened glass at pane size 800 mm×1200 mm, using 3-methacryloxypropyltrimethoxy silane applied as a dilute solution in ethanol as the coupling agent, in a steel reusable frame, the sample met the EW 120 criteria for radiation reduction.

When fire-tested in the form 4/8/4 using toughened glass at pane size 800 mm×1200 mm, using 3-methacryloxypropyltrimethoxy silane applied as a dilute solution in ethanol as the coupling agent, in a steel reusable frame, the sample met the EI 30 criteria for insulation.

When fire-tested in the form 6/8/6 using toughened glass at pane size 1395 mm×2885 mm, using 3-methacryloxypropyltrimethoxy silane applied as a dilute solution in ethanol as the coupling agent, in a timber frame the sample met the EI 30 criteria for insulation and EW 60 criteria for radiation reduction. This test was conducted at Chiltern International Fire Ltd.

This formulation was found to pass the 2000 hour UV weathering test for glazing detailed in BS EN ISO 12543-4:2011 Part 4 in the form 5/8/5. Class 1 impact rating was achieved in the EN12600 pendulum impact test at size 976 mm×1938 mm in the form 4/6/4. These tests were conducted by TÜV Rheinland Nederland B.V.

Further testing procedures were developed in order to investigate the long term durability of the product. This involved preparing gel samples and exposing them to an elevated temperature in thermostatically controlled ovens. It was calculated based on the principles of the Arrhenius equation that approximately 16 weeks exposure to a temperature of 70° C., 8 weeks exposure to a temperature of 80° C., and 2 weeks exposure to a temperature of 100° C. are equivalent to 10 years of aging at ambient (normal use). Similar protocols were disclosed in U.S. Pat. No. 6,479,156B1. GC-8 gels were found to not to exceed this criteria.

Example 9—Gelling Composition 9 (GC9)

A gelling composition (GC9) was prepared using the ingredients listed below (suppliers as per the previous examples):

| Ingredient | M.W. | % w/w |
|---|---|---|
| Water | 18 | 52.641 |
| MgSO$_4$•7H$_2$O (Magnesia 4281) | 246.47 | 13.000 |
| Acrylic Acid | 72.06 | 7.000 |
| Acetic Acid | 60.05 | 4.000 |
| Magnesium Oxide, low iron (Magnesia 298) | 40.3 | 3.334 |
| Irgacure 184 | 204.3 | 0.010 |
| N,N'-Methylenebisacrylamide | 154.17 | 0.015 |
| Magnesium acetate | 214.455 | 17.000 |
| ZnSO$_4$•7H$_2$O | 287.56 | 3.000 |
| Total | | 100 |

A flask fitted with an agitator was charged with MgSO4.7H$_2$O (13 g), magnesium acetate tetrahydrate (17 g), zinc sulphate heptahydrate (3 g) and 52.641 g of distilled water. A clear aqueous solution was obtained after stirring for 10 minutes. To this clear aqueous solution were added acetic acid (4.00 g), acrylic acid (7 g), N,N'-Methylenebisacrylamide (0.015 g) and Irgacure 184 (0.010 g) and the mixture was allowed to stir until a clear solution obtained. Finally 3.33 g of MgO was added. The resultant turbid milky suspension was stirred for 2 hours at 40° C. to obtain a clear solution. The solution was allowed to cool, and was subsequently stored at room temperature.

Test Results for GC9

The cured gel was found to be appreciably optically clear and was seen to intumesce considerably upon application of a flame from a burner.

The gel was found to be sufficiently stable in low temperature durability tests at −12° C., however it was unstable at −20° C.

Example 10—Gelling Composition 10 (GC10)

A gelling composition (GC10) was prepared using the ingredients listed below (suppliers as per previous examples):

| Ingredient | M.W | % w/w |
|---|---|---|
| Water | 18 | 46.075 |
| Acrylic Acid | 72.06 | 7.000 |
| Magnesium Oxide, low iron (Magnesia 298) | 40.3 | 1.900 |
| Irgacure 184 | 204.3 | 0.010 |
| N,N'-Methylenebisacrylamide | 154.17 | 0.015 |
| Magnesium acetate | 214.455 | 40.000 |
| CaCl$_2$•2H$_2$O | 147.01 | 5.000 |
| Total | | 100 |

A flask fitted with an agitator was charged with calcium chloride dihydrate (5 g), magnesium acetate tetrahydrate (40 g), and 46.075 g of distilled water. A clear aqueous solution was obtained after stirring for 10 minutes. To this clear aqueous solution were added acrylic acid (7 g), N,N'-Methylenebisacrylamide (0.015 g) and Irgacure 184 (0.010 g) and the mixture was allowed to stir until a clear solution obtained. Finally 1.90 g of MgO was added. The resultant turbid milky suspension was stirred for 2 hours at 40° C. to obtain a clear solution. The solution was allowed to cool, and was subsequently stored at room temperature.

Test Results for GC10

The cured gel was found to be appreciably optically clear and was seen to intumesce considerably upon application of a flame from a burner.

The gel was found to be sufficiently stable in low temperature durability tests at −12° C., however it was unstable at −20° C.

Example 11—Gelling Composition 11 (GC11)

A gelling composition (GC11) was prepared using the ingredients listed below (suppliers as per previous examples):

| Ingredient | M.W | % w/w |
|---|---|---|
| Water | 18 | 56.076 |
| $MgSO_4 \cdot 7H_2O$ (Magnesia 4281) | 246.47 | 20.000 |
| Acrylic Acid | 72.06 | 7.000 |
| Magnesium Oxide, low iron (Magnesia 298) | 40.3 | 1.900 |
| Irgacure 184 | 204.3 | 0.009 |
| N,N'-Methylenebisacrylamide | 154.17 | 0.015 |
| Magnesium acetate | 214.455 | 5.000 |
| $Li_2SO_4 \cdot H_2O$ | 127.96 | 10.000 |
| Total | | 100 |

A flask fitted with an agitator was charged with lithium sulphate monohydrate (10 g), magnesium sulphate heptahydrate (20 g), magnesium acetate tetrahydrate (5 g), and 56.076 g of distilled water. A clear aqueous solution was obtained after stirring for 10 minutes. To this clear aqueous solution were added acrylic acid (7 g), N,N'-Methylenebisacrylamide (0.015 g) and Irgacure 184 (0.009 g) and the mixture was allowed to stir until a clear solution obtained. Finally 1.90 g of MgO was added. The resultant turbid milky suspension was stirred for 2 hours at 40° C. to obtain a clear solution. The solution was allowed to cool, and was subsequently stored at room temperature.

The gelling composition (GC11) was measured to have a pH of 5.03 prior to gelling.

Test Results for GC11

The cured gel was found to be appreciably optically clear and was seen to intumesce considerably upon application of a flame from a burner.

The gel was found to be sufficiently stable in low temperature durability tests at −12° C., however it was unstable at −20° C.

Example 12—Gelling Composition 12 (GC12)

A gelling composition (GC12) was prepared using the ingredients listed below (suppliers as per previous examples):

| Ingredient | M.W. | % w/w |
|---|---|---|
| Water | 18 | 46.075 |
| Acrylic Acid | 72.06 | 7.000 |
| Magnesium Oxide, low iron (Magnesia 298) | 40.3 | 1.900 |
| Irgacure 184 | 204.3 | 0.010 |
| N,N'-Methylenebisacrylamide | 154.17 | 0.015 |
| Magnesium acetate | 214.455 | 40.000 |
| $CaCl_2 \cdot 2H_2O$ | 147.01 | 5.000 |
| Total | | 100 |

A flask fitted with an agitator was charged with calcium chloride dihydrate (5 g), magnesium acetate tetrahydrate (40 g), and 46.075 g of distilled water. A clear aqueous solution was obtained after stirring for 10 minutes. To this clear aqueous solution were added acrylic acid (7 g), N,N'-Methylenebisacrylamide (0.015 g) and Irgacure 184 (0.010 g) and the mixture was allowed to stir until a clear solution obtained. Finally 1.90 g of MgO was added. The resultant turbid milky suspension was stirred for 2 hours at 40° C. to obtain a clear solution. The solution was allowed to cool, and was subsequently stored at room temperature.

Test Results for GC12

The cured gel was found to be appreciably optically clear and was seen to intumesce considerably upon application of a flame from a burner.

The gel was found to be sufficiently stable in low temperature durability tests at −12° C., however it was unstable at −20° C.

Example 13—Gelling Composition 13 (GC13)

A gelling composition (GC13) was prepared using the ingredients listed below (suppliers as per previous examples):

| Ingredient | M.W. | % w/w |
|---|---|---|
| Water | 18 | 52.707 |
| $MgSO_4 \cdot 7H_2O$ (Magnesia 4281) | 246.47 | 12.6700 |
| Acrylic Acid | 72.06 | 12.0000 |
| Magnesium Oxide, low iron (Magnesia 298) | 40.3 | 2.5800 |
| Irgacure 184 | 204.3 | 0.0170 |
| N,N'-Methylenebisacrylamide | 154.17 | 0.0260 |
| Magnesium acetate | 214.455 | 20.0000 |
| water | 18 | 52.707 |
| Total | | 100 |

A flask fitted with an agitator was charged with magnesium sulphate heptahydrate (12.67 g), magnesium acetate tetrahydrate (20 g), and 52.707 g of distilled water. A clear aqueous solution was obtained after stirring for 10 minutes. To this clear aqueous solution were added acrylic acid (12 g), N,N'-Methylenebisacrylamide (0.026 g) and Irgacure 184 (0.017 g) and the mixture was allowed to stir until a clear solution obtained. Finally 2.58 g of MgO was added. The resultant turbid milky suspension was stirred for 2 hours at 40° C. to obtain a clear solution. The solution was allowed to cool, and was subsequently stored at room temperature.

The pH of the gelling composition was measured as pH 3.40.

Test Results for GC13

The cured gel was found to be appreciably optically clear and was seen to intumesce considerably upon application of a flame from a burner.

The gel was found to be sufficiently stable in low temperature durability tests at −12° C., however it was unstable at −20° C.

Example 14—Gelling Composition 14 (GC14)

A gelling composition (GC14) was prepared using the ingredients listed below (suppliers as per previous examples):

| Ingredient | M.W. | % w/w |
|---|---|---|
| Water | 18 | 51.514 |
| $MgSO_4 \cdot 7H_2O$ (Magnesia 4281) | 246.47 | 18 |
| Acrylic Acid | 72.06 | 10 |
| Magnesium Oxide, low iron (Magnesia 298) | 40.3 | 2.23 |
| Irgacure 184 | 204.3 | 0.014 |
| N,N'-Methylenebisacrylamide | 154.17 | 0.022 |
| Magnesium acetate | 214.455 | 18 |
| Total | | 100 |

A flask fitted with an agitator was charged with magnesium sulphate heptahydrate (18 g), magnesium acetate tetrahydrate (18 g), and 51.514 g of distilled water. A clear aqueous solution was obtained after stirring for 10 minutes. To this clear aqueous solution were added acrylic acid (10 g), N,N'-Methylenebisacrylamide (0.022 g) and Irgacure 184 (0.014 g) and the mixture was allowed to stir until a clear solution obtained. Finally 2.23 g of MgO was added. The resultant turbid milky suspension was stirred for 2 hours at 40° C. to obtain a clear solution. The solution was allowed to cool, and was subsequently stored at room temperature.

The pH of the gelling composition was measured as pH 4.96.

Test Results for GC14

The cured gel was found to be appreciably optically clear and was seen to intumesce considerably upon application of a flame from a burner.

The gel was found to be sufficiently stable in low temperature durability tests at −12° C., however it was unstable at −20° C.

The gelling composition was found to be appreciably optically clear and was seen to intumesce considerably upon application of a flame from a burner.

The gel was found to be sufficiently stable in low temperature durability tests.

The gel was found to be sufficiently stable in the 50° C. high temperature durability tests and passed the 100° C. oven test.

When fire-tested in the form 6/8/6 using toughened glass at pane size 1395 mm×2885 mm, using 3-methacryloxypropyltrimethoxy silane applied as a dilute solution in ethanol as the coupling agent, in a timber frame the sample met the EI 30 criteria for insulation and EW 60 criteria for radiation reduction. This test was conducted at Chiltern International Fire Ltd.

Example 15—Gelling Composition 15 (GC15)

A gelling composition (GC15) was prepared using the ingredients listed below:

| Ingredient | M.W. | % w/w | Supplier |
|---|---|---|---|
| water | 18 | 51.716 | |
| $MgSO4 \cdot 7H2O$ (Magnesia 4281) | 246.47 | 18 | Magnesia Ltd, Luneburgh |
| Acrylic Acid | 72.06 | 10 | Merck Chemicals |
| Magnesium Oxide, low iron (Magnesia 298) | 40.3 | 2.23 | Magnesia Ltd, Luneburgh |
| Irgacure 184 | 204.3 | 0.014 | Ciba speciality Chemicals |
| N,N'-Methylenebisacrylamide | 154.17 | 0.04 | Merck Chemicals |
| Magnesium acetate tetrahydrate | 214.46 | 18 | Sigma |

A flask fitted with an agitator was charged with an aqueous suspension of Magnesium oxide. This was followed by the addition of Acrylic acid to the aqueous suspension and the reaction mixture was stirred for 2 hours until the solution became clear. To this clear solution was added the IR184. A clear aqueous solution was obtained with agitation. To the clear solution obtained above were added $MgSO_4.7H_2O$ and $Mg(OAc)_2.4H_2O$ simultaneously while continuously stirring. The reaction mixture was subsequently allowed to become clear again. Finally MBA was added and reaction mixture stirred until the MBA was completely dissolved, yielding a clear solution.

The solution was allowed to cool and was filtered via 0.22 μm membrane filter, and was subsequently stored at room temperature.

The gelling composition (GC15) was measured to have a pH of 4.80 prior to gelling.

Test Results for GC15

The gel was found to be appreciably optically clear and was seen to intumesce considerably upon application of a flame from a burner.

The gel was found to be sufficiently stable in low temperature durability tests.

When fire-tested in the form 4/8/4 using toughened glass at pane size 800 mm×1200 mm, using 3-methacryloxypropyltrimethoxy silane applied as a dilute solution in ethanol as the coupling agent, in a steel reusable frame, the sample met the EI 60 criteria for insulation.

Samples of the gel were found to exceed a predicted lifetime of 10 years when each were exposed to a temperature of 80° C. and 100° C. using 10 year-durability test protocols described in relation to Example 8 above.

Example 16—Gelling Composition 16 (GC16)

A gelling composition (GC16) was prepared using the ingredients listed below:

| Ingredient | M.W. | % w/w | Supplier |
|---|---|---|---|
| Water | 18 | 51.706 | |
| $MgSO4 \cdot 7H2O$ (Magnesia 4281) | 246.47 | 18 | Magnesia Ltd, Luneburgh |
| Acrylic Acid | 72.06 | 10 | Merck Chemicals |
| Magnesium Oxide, low iron (Magnesia 298) | 40.3 | 2.23 | Magnesia Ltd, Luneburgh |
| Irgacure 184 | 204.3 | 0.014 | Ciba speciality Chemicals |
| N,N'-Methylenebisacrylamide | 154.17 | 0.05 | Merck Chemicals |
| Magnesium acetate tetrahydrate | 214.46 | 18 | Sigma |

GC16 was prepared according to procedure detailed in Example 15.

The gelling composition (GC16) was measured to have a pH of 4.95 prior to gelling.

Test Results for GC16

The gel was found to be appreciably optically clear and was seen to intumesce considerably upon application of a flame from a burner.

The gel was found to be sufficiently stable in low temperature durability tests.

When fire-tested in the form 4/8/4 using toughened glass at pane size 800 mm×1200 mm, using 3-methacryloxypropyltrimethoxy silane applied as a dilute solution in ethanol as the coupling agent, in a steel reusable frame, the sample met the EI 30 criteria for insulation.

Samples of the gel were found to exceed a predicted lifetime of 10 years when exposed to a temperature of 100° C. using 10-year durability test protocols described in relation to Example 8 above.

Example 17—Gelling Composition 17 (GC17)

A gelling composition (GC17) was prepared using the ingredients listed below:

| Ingredient | M.W. | % w/w | Supplier |
|---|---|---|---|
| Water | 18 | 51.696 | |
| MgSO4•7H2O (Magnesia 4281) | 246.47 | 18 | Magnesia Ltd, Luneburgh |
| Acrylic Acid | 72.06 | 10 | Merck Chemicals |
| Magnesium Oxide, low iron (Magnesia 298) | 40.3 | 2.23 | Magnesia Ltd, Luneburgh |
| Irgacure 184 | 204.3 | 0.014 | Ciba speciality Chemicals |
| N,N'-Methylenebisacrylamide | 154.17 | 0.06 | Merck Chemicals |
| Magnesium acetate tetrahydrate | 214.46 | 18 | Sigma |

GC17 was prepared according to procedure detailed in Example 15.

The gelling composition (GC17) was measured to have a pH of 4.84 prior to gelling.

Test Results for GC17

The gel was found to be appreciably optically clear and was seen to intumesce considerably upon application of a flame from a burner.

The gel was found to be sufficiently stable in low temperature durability tests.

Samples of the gel were found to exceed a predicted lifetime of 10 years when exposed to a temperature of 100° C. using 10-year durability test protocols described in relation to Example 8 above.

Example 18—Gelling Composition 18 (GC18)

A gelling composition (GC18) was prepared using the ingredients listed below:

| Ingredient | M.W. | % w/w | Supplier |
|---|---|---|---|
| Water | 18 | 51.016 | |
| MgSO4•7H2O (Magnesia 4281) | 246.47 | 18 | Magnesia Ltd, Luneburgh |
| Acrylic Acid | 72.06 | 10 | Merck Chemicals |
| Magnesium Oxide, low iron (Magnesia 298) | 40.3 | 2.23 | Magnesia Ltd, Luneburgh |
| Irgacure 184 | 204.3 | 0.014 | Ciba speciality Chemicals |
| N,N'-Methylenebisacrylamide | 154.17 | 0.04 | Merck Chemicals |
| Magnesium acetate tetrahydrate | 214.46 | 18 | Sigma |
| Lithium Hydroxide | 41.96 | 0.7 | |

A flask fitted with an agitator was charged with an aqueous suspension of Magnesium oxide. This was followed by the addition of Acrylic acid to the aqueous suspension and the reaction mixture was stirred for 2 hours until the solution became clear. To this clear solution was added the IR184. A clear aqueous solution was obtained with agitation. To the clear solution obtained above were added $MgSO_4.7H_2O$, LiOH and $Mg(OAc)_2.4H_2O$ simultaneously while continuously stirring. The reaction mixture was subsequently allowed to become clear again. Finally MBA was added and reaction mixture stirred until the MBA was completely dissolved, yielding a clear solution.

The solution was allowed to cool and was filtered via 0.22 µm membrane filter, and was subsequently stored at room temperature.

The gelling composition (GC18) was measured to have a pH of 5.5 prior to gelling.

Test Results for GC18

The gel was found to be appreciably optically clear and was seen to intumesce considerably upon application of a flame from a burner.

The gel was found to be sufficiently stable in low temperature durability tests.

When fire-tested in the form 4/8/4 using toughened glass at pane size 800 mm×1200 mm, using 3-methacryloxypropyltrimethoxy silane applied as a dilute solution in ethanol as the coupling agent, in a steel reusable frame, the sample met the EI 15 criteria for insulation.

Samples of the gel were found to exceed a predicted lifetime of 10 years when exposed to a temperature of 100° C. using 10-year durability test protocols described in relation to Example 8 above.

Example 19—Gelling Composition 19 (GC19)

A gelling composition (GC19) was prepared using the ingredients listed below:

| Ingredient | M.W. | % w/w | Supplier |
|---|---|---|---|
| Water | 18 | 49.716 | |
| MgSO4•7H2O (Magnesia 4281) | 246.47 | 18 | Magnesia Ltd, Luneburgh |
| Acrylic Acid | 72.06 | 10 | Merck Chemicals |
| Magnesium Oxide, low iron (Magnesia 298) | 40.3 | 2.23 | Magnesia Ltd, Luneburgh |
| Irgacure 184 | 204.3 | 0.014 | Ciba speciality Chemicals |
| N,N'-Methylenebisacrylamide | 154.17 | 0.04 | Merck Chemicals |
| Magnesium acetate tetrahydrate | 214.46 | 18 | Sigma |
| Ammonium Hydroxide (30% aqueous solution) | 35.05 | 2 | |

A flask fitted with an agitator was charged with an aqueous suspension of Magnesium oxide. This was followed by the addition of Acrylic acid to the aqueous suspension and the reaction mixture was stirred for 2 hours until the solution became clear. To this clear solution was added the IR184. A clear aqueous solution was obtained with agitation. To the clear solution obtained above were added MgSO$_4$.7H$_2$O, Ammonium Hydroxide solution and Mg(OAc)$_2$.4H$_2$O simultaneously while continuously stirring. The reaction mixture was subsequently allowed to become clear again. Finally MBA was added and reaction mixture stirred until the MBA was completely dissolved, yielding a clear solution.

The solution was allowed to cool and was filtered via 0.22 µm membrane filter, and was subsequently stored at room temperature.

The gelling composition (GC19) was measured to have a pH of 5.5 prior to gelling.

Test Results for GC19

The gel was found to be appreciably optically clear and was seen to intumesce considerably upon application of a flame from a burner.

The gel was found to be sufficiently stable in low temperature durability tests.

When fire-tested in the form 4/8/4 using toughened glass at pane size 800 mm×1200 mm, using 3-methacryloxypropyltrimethoxy silane applied as a dilute solution in ethanol as the coupling agent, in a steel reusable frame, the sample met the EI 15 criteria for insulation.

Samples of the gel were found to exceed a predicted lifetime of 10 years when exposed to a temperature of 100° C. using 10-year durability test protocols described in relation to Example 8 above.

Example 20—Gelling Composition 20 (GC20)

A gelling composition (GC20) was prepared using the ingredients listed below:

| Ingredient | M.W. | % w/w | Supplier |
|---|---|---|---|
| water | 18 | 50.934 | |
| MgSO4•7H2O (Magnesia 4281) | 246.47 | 18 | Magnesia Ltd, Luneburgh |
| Acrylic Acid | 72.06 | 10 | Merck Chemicals |
| Magnesium Oxide, low iron (Magnesia 298) | 40.3 | 2.23 | Magnesia Ltd, Luneburgh |
| Irgacure 184 | 204.3 | 0.014 | Ciba speciality Chemicals |
| N,N'-Methylenebisacrylamide | 154.17 | 0.022 | Merck Chemicals |
| Magnesium acetate tetrahydrate | 214.46 | 18 | Sigma |
| Sodium Hydroxide | 40 | 0.8 | |

A flask fitted with an agitator was charged with an aqueous suspension of Magnesium oxide. This was followed by the addition of Acrylic acid to the aqueous suspension and the reaction mixture was stirred for 2 hours until the solution became clear. To this clear solution was added the IR184. A clear aqueous solution was obtained with agitation. To the clear solution obtained above were added MgSO$_4$.7H$_2$O, Sodium Hydroxide and Mg(OAc)$_2$.4H$_2$O simultaneously while continuously stirring. The reaction mixture was subsequently allowed to become clear again. Finally MBA was added and reaction mixture stirred until the MBA was completely dissolved, yielding a clear solution.

The solution was allowed to cool and was filtered via 0.22 µm membrane filter, and was subsequently stored at room temperature.

The gelling composition (GC20) was measured to have a pH of 6.75 prior to gelling.

Test Results for GC20

The gel was found to be appreciably optically clear and was seen to intumesce considerably upon application of a flame from a burner.

The gel was found to be sufficiently stable in low temperature durability tests.

When fire-tested in the form 4/8/4 using toughened glass at pane size 800 mm×1200 mm, using 3-methacryloxypropyltrimethoxy silane applied as a dilute solution in ethanol as the coupling agent, in a steel reusable frame, the sample met the EI 15 criteria for insulation.

Samples of the gel were found to exceed a predicted lifetime of 10 years when exposed to a temperature of 100° C. using 10-year durability test protocols described in relation to Example 8 above.

Example 21—Gelling Composition 21 (GC21)

A gelling composition (GC21) was prepared using the ingredients listed below:

| Ingredient | M.W. | % w/w | Supplier |
|---|---|---|---|
| Water | 18 | 51.596 | |
| MgSO4•7H2O (Magnesia 4281) | 246.47 | 18 | Magnesia Ltd, Luneburgh |
| Acrylic Acid | 72.06 | 10 | Merck Chemicals |
| Magnesium Oxide, low iron (Magnesia 298) | 40.3 | 2.35 | Magnesia Ltd, Luneburgh |
| Irgacure 184 | 204.3 | 0.014 | Ciba speciality Chemicals |
| N,N'-Methylenebisacrylamide | 154.17 | 0.04 | Merck Chemicals |
| Magnesium acetate tetrahydrate | 214.46 | 18 | Sigma |

GC21 was prepared according to procedure detailed in Example 15.

The gelling composition (GC15) was measured to have a pH of 5.1 prior to gelling.

Test Results for GC20

The gel was found to be appreciably optically clear and was seen to intumesce considerably upon application of a flame from a burner.

The gel was found to be sufficiently stable in low temperature durability tests.

Samples of the gel were found to exceed a predicted lifetime of 10 years when exposed to a temperature of 100° C. using 10-year durability test protocols described in relation to Example 8 above.

SUMMARY

The properties desired of gelling compositions (and their corresponding cured gel forms) in the context of the present invention are:

Intumescence.

Fire-resistance durability as a fire-protective barrier to maintain integrity.

Fire-resistance durability as a fire-protective barrier to maintain integrity and insulation.

Fire-resistance durability as a fire-protective barrier to maintain integrity and radiation reduction.

A high melting point crust.

Stability over a wide range of operating temperatures.

Transparency and the retention thereof across a range of ambient temperatures.

Low propensity to form bubbles in normal use.

Protection of "cold side" glass in order to maintain integrity.

Ability to harden on curing.

Storage stability of uncured forms of the gelling composition.

The compositions of the present invention exhibit some or all of the above properties to varying degrees, and as such represent a contribution to the technical field of fire-resistant glazing units.

The performance of Example formulations 1-13 is summarised as follows:

Example 6 was deemed to exhibit the best all round performance, though some or all advantages of the invention were also realised in relation to the other examples.

CONCLUSION

Fire resistance requirements are becoming more stringent and fire resistant glazings that were once deemed satisfactory are being pushed out of use by trends in regulation. These trends in regulation are as a result of increased knowledge in fire safety engineering and changes in architectural fashion. It is believed that this invention is capable of meeting these new demands and exceeding the performance of many equivalent systems in the field in terms of it being of lesser mass per m² of glazing than other equivalent fire resistant products for a given duration of fire resistance and it being economical to produce. All of the components of the preferred embodiment are relatively easy to obtain and the production process can be a simple augment to a conventional IGU production line. Advantageously, the components of the preferred gelling compositions are relatively environmentally benign and as such do not pose significant hazard upon handling and disposal of components before or after gelling or during or after a fire has taken place.

What is claimed is:

1. A gelling composition for forming a fire-resistant hydrogel interlayer within a glazing unit, the gelling composition obtained by mixing together:
   5-40% w/w of a curable hydrogel-forming component;
   20-60% w/w of one or more salts; and
   an aqueous vehicle;
   wherein the sum total of % w/w of all ingredients mixed together to obtain the gelling composition, including any further ingredients, is 100% w/w;
   characterised in that:
   the composition has a pH between 3 and 6.8; and
   the one or more salt(s) comprise monovalent or divalent metal cations or a combination thereof;
   the curable hydrogel-forming component comprises:
   a polymerisable hydrophilic monomer selected from the group consisting of acrylic acid, methacrylic acid, itaconic acid, vinylsulfonic acid, allylsulfonic acid, methallylsulfonic acid, styrenesulfonic acid, 2-acrylamide-2-phenylpropanesulfonic acid, 2-acrylamide-2-methyl-propanesulfonic acid, vinyl phosphoric acid, (meth)acrylate of ethylene oxide-modified phosphoric acid, N,N-dimethylaminoethyl methacrylate, N,N-diethylaminoethyl methacrylate, N,N-dimethylaminoethyl acrylate, N,N-dimethylaminopropylmethacrylamide, N,N-dimethylaminopropylacrylamide; or
   a polymerisable hydrophilic monomer defined by Formula (I):

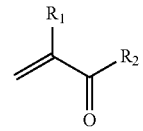

wherein R₁ is H, or (1-2C)alkyl;
R₂ is selected from OH, OR₃, NH₂, NHR₃, and NR₃R₄; and
R₃ and R₄ are independently (1-2C)alkyl;
or a salt thereof.

2. The gelling composition as claimed in claim 1, wherein the gelling composition is a curable gelling composition, which can be cured to form a polyelectrolyte hydrogel.

3. The gelling composition as claimed in claim 1, wherein the pH of the gelling composition is between 4 and 5.5.

4. The gelling composition as claimed in claim 1, wherein the gelling composition further comprises 0.02-0.08% w/w cross-linking agent.

5. The gelling composition as claimed in claim 1, wherein the one or more salts constitute 35-52% w/w of the gelling composition.

6. The gelling composition as claimed in claim 1, wherein the one or more salt(s) comprise magnesium sulphate.

7. The gelling composition as claimed in claim 1, wherein the one or more salt(s) comprise magnesium acetate.

8. The gelling composition as claimed in claim 1, wherein the one or more salts are or include one or more metal salts including magnesium sulphate, magnesium oxide, and magnesium acetate.

9. The gelling composition as claimed in claim 8, wherein the gelling composition comprises:
   5-35% w/w MgSO₄.7H₂O;
   0-3% w/w MgO;
   5-35% w/w Mg(OAc)₂.4H₂O.

10. The gelling composition as claimed in claim 1, wherein the gelling composition comprises 6-15% w/w hydrogel-forming component.

11. The gelling composition as claimed in claim 1 wherein the hydrogel-forming component is acrylic acid.

12. The gelling composition as claimed in claim 1, wherein the gelling composition comprises:
   6-16% w/w acrylic acid;
   20-60% w/w of one or more salts, including:
     5-35% w/w (of composition as a whole) MgSO₄.7H₂O;
     0-3% w/w (of composition as a whole) MgO;
     5-35% w/w (of composition as a whole) Mg(OAc)₂.4H₂O;
   water;
   0.02-0.08% w/w cross-linking agent;
   0.001-0.05% w/w photoinitiator; and
   wherein the composition has a pH between 4 and 6.

13. A process for forming a glazing unit, the process comprising:
   (i) providing a first and a second transparent pane;
   (ii) partially assembling the glazing unit such that the first and second transparent panes are spaced apart from one another and a sealing means holds the first and second panes in position; wherein;
     the sealing means comprises an opening; and
     the first and second panes and the sealing means together define an internal space;
   (iii) delivering a gelling composition as claimed in claim 1 into the internal space through the opening in the sealing means;
   (iv) closing the opening in the sealing means to provide a sealed internal space; and (v) curing the gelling composition to provide a hydrogel gel interlayer within the internal space;
wherein the gel is bonded to the inner surfaces of the first and/or second transparent panes by either coating at least one of the internal surfaces of the first and/or second panes with a coupling agent prior to step (iii) or incorporating the coupling agent into the gelling composition.

14. A glazing unit comprising a first transparent pane and a second transparent pane with an interlayer disposed therebetween, wherein the interlayer is a hydrogel formed by curing the gelling composition as claimed in claim 1.

15. The gelling composition of claim 1, wherein the one or more salts constitute 30-60% w/w of the gelling composition.

16. The gelling composition of claim 1, wherein the monovalent and divalent metal cations are selected from the group consisting of $Na^+$, $K^+$, $Li^+$, $Mg^{2+}$, $Ca^{2+}$, and $Zn^{2+}$.

17. The gelling composition of claim 1, wherein the curable hydrogel-forming component comprises a hydrophilic polymerisable monomer that is a vinyl-containing monomer that polymerises to form a polyelectrolyte having pendant ionisable groups.

18. The gelling composition of claim 1, wherein the hydrogel-forming component comprises a polymerisable hydrophilic monomer, wherein the polymerisable monomer is an acrylate or alkylacrylate monomer of Formula (I):

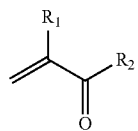

(I)

wherein $R_1$ is H or (1-2C)alkyl;
$R_2$ is selected from OH, $OR_3$, $NH_2$, $NHR_3$, and $NR_3R_4$; and
$R_3$ and $R_4$ are independently (1-2C)alkyl;
or a salt thereof.

19. The gelling composition of claim 18, wherein the hydrogel-forming component is acrylic acid.

20. The gelling composition of claim 1, wherein the curable hydrogel-forming component comprises an acrylate or alkylacrylate monomer of Formula (I):

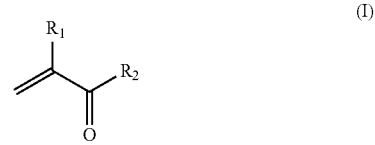

wherein $R_1$ is H or (1-2C)alkyl;
$R_2$ is selected from OH, $OR_3$, $NH_2$, $NHR_3$, and $NR_3R_4$; and
$R_3$ and $R_4$ are independently (1-2C)alkyl;
or a salt thereof;
the composition has a pH between 4 and 5.5; and
the one or more salt(s) comprise divalent metal cations.

21. The gelling composition of claim 1, wherein the gelling composition is a transparent solution.

22. The gelling composition of claim 1, wherein the pH is between 3 and 6.

23. The gelling composition of claim 1, wherein the gelling composition comprises an initiator that is a photoinitiator.

24. The gelling composition of claim 1, wherein an initiator is present within the gelling composition, and the initiator comprises 0.001-0.05% w/w of the total gelling composition.

25. The gelling composition of claim 1, wherein the one or more salts comprise a mixture of metal salts.

26. The gelling composition of claim 1, wherein the one or more salts comprise divalent cations.

* * * * *